(12) United States Patent
Hou

(10) Patent No.: US 7,047,267 B2
(45) Date of Patent: *May 16, 2006

(54) MERGE AND SPLIT KARHUNEN-LOEVE BLOCK TRANSFORM METHOD

(75) Inventor: Hsieh S. Hou, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 586 days.

This patent is subject to a terminal disclaimer.

(21) Appl. No.: 10/175,397

(22) Filed: Jun. 19, 2002

(65) Prior Publication Data

US 2003/0236807 A1 Dec. 25, 2003

(51) Int. Cl.
*G06F 17/14* (2006.01)

(52) U.S. Cl. .................................... 708/400
(58) Field of Classification Search ......... 708/400–405
See application file for complete search history.

(56) References Cited

U.S. PATENT DOCUMENTS

| 5,371,696 | A | * | 12/1994 | Sundararajan et al. ...... 708/409 |
| 5,408,425 | A | * | 4/1995 | Hou ........................... 708/402 |
| 5,790,441 | A | * | 8/1998 | Oami et al. .................. 708/402 |
| 5,987,184 | A | * | 11/1999 | Kweon et al. ............... 382/250 |
| 6,324,560 | B1 | * | 11/2001 | Malvar ....................... 708/400 |
| 6,684,235 | B1 | * | 1/2004 | Turney et al. ............... 708/400 |
| 6,757,343 | B1 | * | 6/2004 | Ortega et al. ............... 708/300 |
| 2002/0194196 | A1 | * | 12/2002 | Weinberg et al. ......... 707/104.1 |

* cited by examiner

*Primary Examiner*—Tan V. Mai
(74) *Attorney, Agent, or Firm*—Derrick Michael Reid

(57) ABSTRACT

Discrete Karhunen-Loeve Transforms in a radix-2 block transform method enables true split and merge transform processing of equal sized data halves in the KLT domain for enabling recursive merges and splits in the KLT domain without data degradation. Input data in the time domain or spatial domain during either the split and merge radix-2 forward transform processing is firstly transform processed followed by combinational processing. Whole transformed data is split using combinational processing into transformed halves in the transform domain as a true split. Transformed halves are merged using combinational processing into whole merged transformed data in the transform domain. Time or spatial domain input data can be transformed into the transform domain in the form of split halves or merged whole. The split halves are merged by the merge process combinational processing and the merged whole are split by the split process combinational processing.

19 Claims, 26 Drawing Sheets

LOSSLESS MERGE & SPLIT GENERAL BLOCK TRANSFER PROCESS

LOSSLESS MERGE & SPLIT GENERAL BLOCK TRANSFER PROCESS

Nth ORDER RADIX-2 GBT SPLIT BLOCK PROCESS

Nth-ORDER RADIX-2 FFT SPLIT BLOCK PROCESS

8th-ORDER FFT RADIX-2 SPLIT FLOW PROCESS

Nth-ORDER RADIX-2 FFT MERGE BLOCK PROCESS

8th-ORDER FFT RADIX-2 MERGE FLOW PROCESS

Nth-ORDER RADIX-2 FHT SPLIT BLOCK PROCESS

8th-ORDER FHT RADIX-2 SPLIT FLOW PROCESS

Nth-ORDER RADIX-2 FHT MERGE BLOCK PROCESS

8th-ORDER RADIX-2 FHT MERGE FLOW PROCESS

8th-ORDER RADIX-2 DECIMATION-IN-FREQUENCY DCT SPLIT BLOCK PROCESS

8th-ORDER DCT RADIX-2 DECIMATION-IN-FREQUENCY SPLIT FLOW PROCESS

Nth-ORDER RADIX-2 DECIMATION-IN-FREQUENCY DCT MERGE BLOCK PROCESS

8th-ORDER RADIX-2 MERGE DECIMATION-IN-FREQUENCY FORWARD DCT MERGE FLOW PROCESS

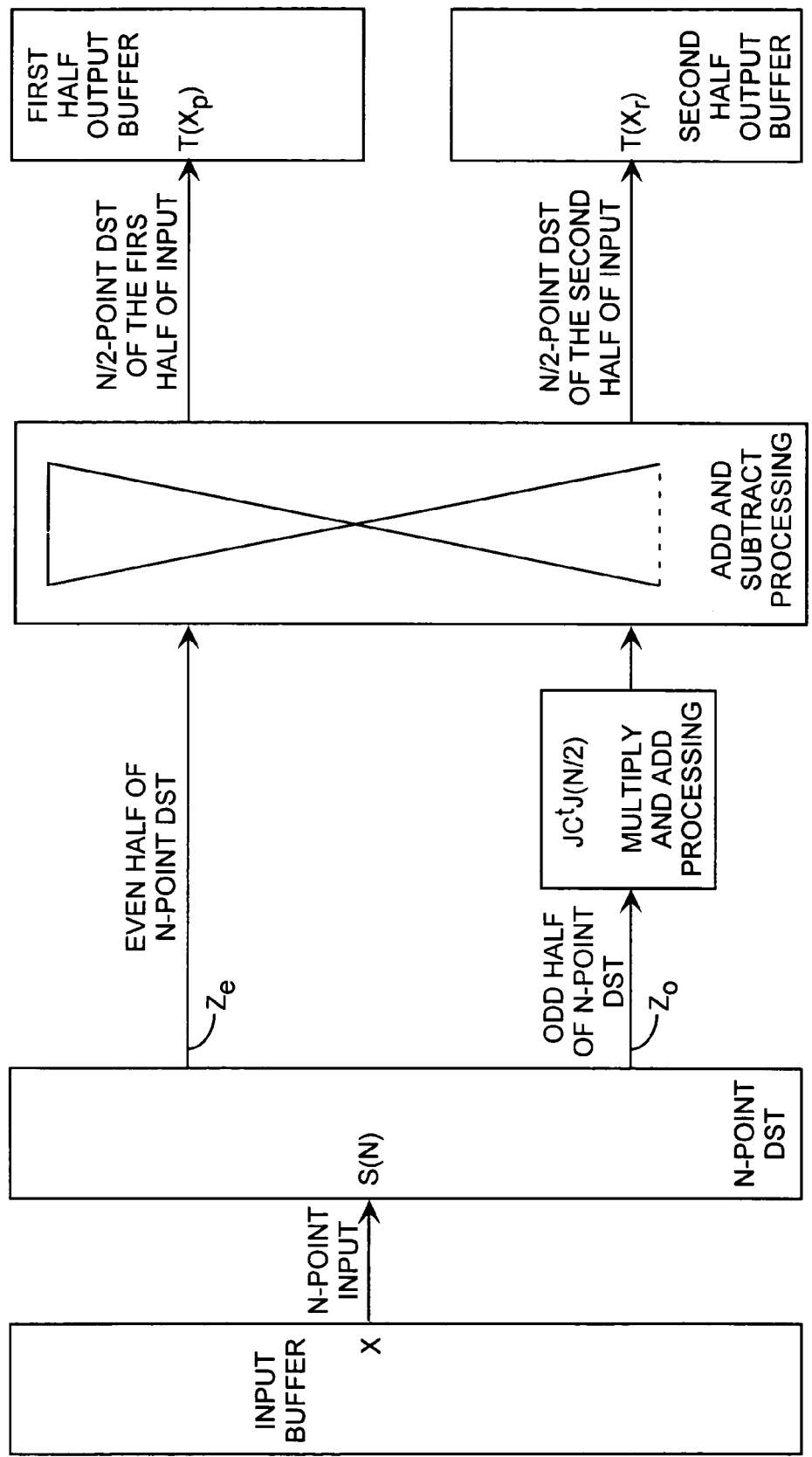
FIG. 5A  Nth-ORDER RADIX-2 DST FOR SPLIT BLOCK PROCESS

8th-ORDER DST RADIX-2 SPLIT FLOW PROCESS

Nth-ORDER RADIX-2 DST MERGE BLOCK PROCESS

8th-ORDER RADIX-2 MERGE DST MERGE FLOW PROCESS

Nth-ORDER RADIX-2 KLT SPLIT BLOCK PROCESS

8th-ORDER KLT RADIX-2 SPLIT FLOW PROCESS

Nth ORDER RADIX-2 KLT MERGE BLOCK PROCESS

8th-ORDER KLT RADIX-2 MERGE FLOW PROCESS

C(4) COMBINER

FUSED OPERATION PROCESS

FIR TRANSVERSAL FILTER

MERGE AND SPLIT KARHUNEN-LOEVE BLOCK TRANSFORM METHOD

REFERENCE TO RELATED APPLICATION

The present application is one of six related copending applications including a base application entitled Merge and Split Generalized Block Transform Method, Ser. No. 10/175,388 and five specific applications entitled Merge and Split Fast Hartley Block Transform Method, Ser. No. 10/174,894; Merge and Split Fast Fourier Block Transform Method, Ser. No. 10/177,197; Merge and Split Discrete Cosine Block Transform Method, Ser. No. 10/175,594; Merge and Split Discrete Sine Block Transform Method, Ser. No. 10/174,925; Merge and Split Karhunen-Loeve Block Transform Method, Ser. No. 10/175,397; all filed Jun. 19, 2002, by the same inventor.

FIELD OF THE INVENTION

The invention relates to the field of separate and combine block transforms for communicating data. More particularly, the present invention relates to a new class of true merge and split forward transforms for lossless recursive merging and splitting of transformed data in the transform domain.

BACKGROUND OF THE INVENTION

Conventional transforms including the Fast Fourier Transform (FFT), the Fast Hartley Transform (FHT), the Discrete Cosine Transform (DCT), the Discrete Sine Transform (DST), and the Discrete Karhunen-Loeve Transform (KLT) have been used for some time for the compression and decompression of data, where data is separated and combined in the transform domain using radix-2 transforms. The traditional methods that perform separation and combination on the transformed data blocks require that the individual blocks be inversely transformed back to the spatial domain because these existing fast transforms do not have the capability of performing true merge and split strictly in the transform domain. For example, video composing is substantially speedup by performing the operations in the fast transform domain with the transform coefficients having been quantized into integers. The quantization process produces degradation loss of image quality. Manipulation in the transform domain results in further degradation of image quality. To avoid digression when manipulating data in the transform domain, the transformed quantized data is inversely transformed back into the spatial domain, when the data can be further manipulated. However, each time that data is transformed, image quality is degraded. Without true merge and split that would enable convenient repetitive data manipulation in the transform domain, data is disadvantageously transformed back into the time or spatial domain.

A forward transform places a data set from the time domain or spatial domain into the transform domain where the transform domain data can be efficiently transform domain processed. After forward transform domain processing, the transform domain data can be then be inversely transformed back into the original time domain or spatial data with a degradation in data quality when transforming the data due to quantization of the input data set. It is desirable to avoid further data degradation to the data set during transform domain merging, splitting, manipulations, and other transform domain processes.

A forward transform operating on first and second halves of the input data can not simply transform the first and second halves of the input data into a first and a second half transformed output data independently and then simply inversely and independently transform the first and second half back into the original data, due to interdependence across the transformed data set. As such, the transformation process requires some form of combinational processing of both halves of the data set.

To speed transform operations, the prior art has developed fast transforms based on separation and combination transform processing of first and second halves into odd and even transform sets using combinational and transform processing. The transforms are used to place input data into the transform domain for convenient transform domain processing of the transform data. For forward transforms, the input data is in the time domain or spatial domain, and the output data is in the transform domain. Transformation methods use a variety of transforms, the FFT, FHT, DCT, DST, and KLT, in addition to combinational processing that includes twiddle factoring or rotational multiplying, with add and subtract processing. The combinational processing and transform processing define the transform process as either a separating or a combining transformation process.

A separate transform block process transforms first and second input data halves into output transform odd and even halves. The separate transform block process can be a decimation-in-frequency or a decimation-in-time process. The separate transform configuration includes front-end combinational processing followed by N/2 point, that is half-sized, transforms. Input time domain or spatial data is forward transformed into half size transformed data blocks in the transform domain during a separate transformation process where the input data is separated and transformed into transformed even and odd data halves.

A combine transform block process transforms odd and even input data halves into first and second output transforms halves forming a combined transformed output. The combine transform block process can be a decimation-in-time or a decimation-in-frequency transformation process. The combine transform configuration includes front-end N/2 point transforms followed by combinational processing. Input time domain or spatial domain data is forward transformed into combined transformed data in the transform domain during a combine transformation process where the input data halves are combined into combined transformed data. Prior art transform processes are referred to as separate and combine transformation processes, and are not true split and merge transformation processes, because the true merge and split transformation processing enables true splitting and merging in the transform domain, whereas the conventional transforms methods do not.

In editing and composition transform applications, data is often processed in the transform domain. During the initial transformation of an input data set, data is degraded by virtue of quantized truncation to place the output transform data into integers. Such transformed data can then be split and merged without degradation of data quality. However, the prior art transforms require inverse transformations to place the transform domain data back into the time or spatial domain, and then again forward transform time or spatial data, and then combined the transformed data. The inverse transformations and retransformation can result in additional degradation of data quality. The prior art has not developed a systematic generalized approach to true merge and split radix-2 forward transformation. Rather, the prior art teaches a potpourri of disjointed separate and combine radix-2 transform processes that are not true merge and split transforms, but rather separate and combine transformation that disadvantageously require additional inverse transformations and data degradation when separating and combining transform data.

The radix-2 (N/2) transform is a split half transform of a large whole N transform. When radix-2 transforms can be split by two and merged by two without requiring inverse transformations, the processing in the transform domain becomes exceedingly efficient without the loss of data quality when recursively splitting and merging the transformed data. The prior art transforms do not provide true merge and split transform processing because of the required inverse transformations to perfect a combination after a separation, or a separation after a combination of the transformed data. It is highly desirable in data compression applications to have a true merge and split radix-2 transform processing input data halves, where the transformed halves can be directly split and then directly merged in the transform domain without data degradation.

For example, existing fast radix-2 Discrete Cosine Transform algorithms are unable to merge or split data blocks strictly in the DCT domain. In the existing radix-2 algorithms, the DCT matrix must be factorized into two half-sized transform matrices, only one of which is a lower-order DCT preventing the half-sized transforms from being utilized in transform domain processing.

In general, the existing transforms are forward transforms using half-sized transforms followed by or preceded by combinational processing, including scalars, permutations, additions, subtractions, multiplications, and twidders. Data is separated into transform halves using two ½ transforms followed by combinatory logic. Data halves are combined into transform wholes using two ½ transforms followed by combinatory logic. In both forward process transformations, data quality is degraded. The transform halves cannot be merged without firstly inversely transforming transform halves. The transform wholes can not be separated without firstly inversely transforming transform halves. Hence, the existing forward transforms are incapable of successive true merges and splits in any back-and-forth order. Consequently, data is degraded while inversely transforming and data can not be conveniently manipulated in the transform domain without further data degradation. These and other disadvantages are solved or reduced using the invention.

SUMMARY OF THE INVENTION

An object of the invention is to recursively split data into transform halves without degrading data quality.

Another object of the invention is to recursively merge data halves into a transform whole without degrading data quality.

Yet another object of the invention is to recursively split data into transform halves without degrading data quality, to recursively merge data halves into a transform whole without degrading data quality, to recursively merge the transform halves into the transform whole without data degradation and without inversely transforming the transform halves, and to recursively split the transform whole into the transform halves without data degradation and without inversely transforming the transform whole.

Still another object of the invention is to provide a generalized transform method, that can be applied to Fast Fourier Transforms (FFTs), Fast Hartley Transforms (FHTs), Discrete Cosine Transforms (DCTs), Discrete Sine Transforms (DSTs), and the Discrete Karhunen-Loeve Transforms (KLTs), that can split data into transform halves without degrading data quality, that can merge data halves into a transform whole without degrading data quality, that can merge the transform halves into the transform whole without data degradation and without inversely transforming the transform halves, and that can split the transform whole into the transform halves without data degradation and without inversely transforming the transform whole, and that can recursively back-and-forth merge and split transform data in the transform domain.

The present invention is directed, in a generalized approach, to true direct split and merge transform processing of equal sized data halves in the transform domain. The invention, in the general aspect, is directed to a new class block transforms that enables true successive and back-and-forth merge and split forward transformations without data degradation. Input data in the time domain or spatial domain during either split or merge radix-2 forward transform processing is firstly transform processed followed by combinational processing. In the split transform process, input data is split into first and second transformed data halves in the transform domain as a true split. In the merge transform process, first and second time domain data halves are merged into a merged transformed output. In either case, time or spatial domain input data can be transformed into the transform domain in the form of split halves or merged wholes. The split halves and merged wholes can then be successively recursively further split or merged in the transform domain without inverse transformation and without resulting data degradation. That is, the merge and split transformation processes can be used to merge and split transform data without having to inversely transform transformed domain data back into the time or spatial domain.

Referring to FIG. 1A, the present invention in the general form enables true split and merge operation in the transform domain using unique processing architectural characteristics. A first unique characteristic is that both merge and split processes firstly front-end transform process the input data into transform data and then secondly back-end combinationally $CL_A$ and $CL_B$ process the transform data into merged transformed whole data or split transformed half data, respectively. The second unique characteristic is that the split process uses a whole G transform and the merge process uses radix-2 G/2 transforms of the whole transform as a true radix-2 transform process. A third unique characteristic, flowing the first and second characteristics, is that the back-end combinational processing can be cross-fed between the merge and split combinational processing for true recursive splits and merges in the transform domain. Particularly, the split transformed data halves output from the split combinational logic $CL_A$ processing can be cross-fed into the merge combinational logic $CL_B$ processing for merging the two transformed halves into the merged transformed whole data, and the merged transformed whole data can be cross-fed into the split combinational logic $CL_A$ processing for splitting the merged transform whole data into the split transformed halves data. The cross-fed radix-2 recursive true merge and split transformation capability enable manipulation of data in the transform domain without data degradation.

Referring to FIGS. 1B and 1C, the general block transform processed performs true split and merge block transform processes. For example, transformed output data of the split block process shown in FIG. 1B, is split into first and second transform halves $G(X_p)$ and $G(X_r)$ that can then be an input into the combinational processing of the merge block process for merging the first and second transform halves $G(X_p)$ and $G(X_r)$ back into a merged transformed output as shown in FIG. 1C. For another example, the merged transformed output data of the merge block process of FIG. 1C is a merged transformed output of even and odd halves $Z_e$ and $Z_o$ that can then be an input $Z_o$ and $Z_e$ into the combinational processing of the split block process for splitting merged transformed domain output data $Z_o$ and $Z_e$ back into first and second transform halves $G(X_p)$ and $G(X_r)$ using the combinational processing of the split block process of FIG. 1B. The split transform data can be recursively split, and merged transformed data can be recursively merged. Merged and split data can be back-and-forth recursively merged or split, all in the transform domain, without data degradation, and without inversely transforming the forward transformed data. Two transformed data halves can be merged into the merged transformed data that can be split back into the two transformed half data without data degradation occurring and without inversely transforming the transformed data halves. Likewise, the merged transformed whole data can be split into the two transformed half data and then merged back into merged transformed data without data degradation and without inversely transforming the transformed data whole. The radix-2 split transformed data can be successively recursively split again and again with each split being a radix-2 split, to the radix-Nth split where N is number of the power of two, and each split is generated using smaller ½ size combinational processing. For example, the radix-2 split transform data can be fed to a $CL_A/2$ split combinational process splitting the radix-2 split transformed data into half size radix-4 split transformed data. The half size radix-4 split transformed data can be further split again, or merged, for example, by a half size $CL_B/2$ combinational process back into the original radix-2 split transformed data. As may be apparent, $CL_A$ is a double size split combinational process being twice the number of points of the $CL_A/2$ combinational process, and, $CL_B$ is a double size merge combinational process being twice the number of points of the $CL_B/2$ half size combinational process. Recursive splits are recursive successive splits and recursive merges are recursive successive merges. Recursive splits and merges are recursive back-and-forth splits and merges. The transformed data can be recursively, either successively or back-and-forth, split and merged by half size and double size merge and split combinational processes. The primary benefit of the invention is the ability to perform recursive back-and-forth splits and merges in the transform domain without data degradation nor having to inversely transform the data.

The invention is characterized by an identity relationship between the merge and split operations. The equation $G(N) = (1/\sqrt{2})P(N)[M/A][A/S][G/2, G/2]$ models the merging transform process, and the $[G/2, G/2] = (1/\sqrt{2})[A/S][M/A]P(N)G(N)$ models the split transform process. The scalar $\sqrt{2}$, permutator P, add and subtract processing [A/S], multiply and add processing [M/A] are grouped together as combinational processing so that $G(N)=[CL][G/2, G/2]$, and $[G/2, G/2]=[CL/2]G(N)$ as an identity relationship, where G(N) is the whole transform and the two G/2 transforms are radix-2 half transforms. The true decimation-in-frequency process can merge and split data blocks for real-time video composing while the true decimation-in-time process may be used for spatial resolution conversion. The general form of the invention can be applied to unitary transforms, such as the FFT, FHT, DCT, DST and KLT in a wide range of applications. These and other advantages will become more apparent from the following detailed description of the preferred embodiment.

BRIEF DESCRIPTION OF THE DRAWINGS

FIG. 5A is a block diagram of an Nth order radix-2 DST split block process.

DETAILED DESCRIPTION OF THE PREFERRED EMBODIMENT

Various detailed embodiments of the invention are described with reference to the FIGS. 2A through 6B using reference designations as shown in the figures. The transformation methods are shown by high-level block process diagrams for both the split and merge transformations, and are then shown by exemplar detailed flow processes for both split and merge transformations. In the flow diagrams, the dots represent additions, dashed lines represent sign changes, circles and mathematical references are multiplications, with the transforms and combinational logic shown as blocks.

Fast Fourier Transforms (FFT)

Referring to FIGS. 2A through 2D, the Discrete Fourier transform (DFT) in one dimension is defined by a DFT equation.

$$z(k) = \frac{1}{\sqrt{N}} \sum_{n=0}^{N-1} [\cos(2\pi nk/N) + j\sin(2\pi nk/N)]x(n)$$

The fast Fourier transform (FFT) in one dimension is represented by the linear equation z=F(N)x, where x is the input vector with elements $\{x_n; n=0,1,2,\ldots,N-1\}$ and z is the output vector with elements $\{z_k; k=0,1,2,\ldots,N-1\}$. All the elements in both x and z are arranged in natural order. F(N) is the orthonormal Fourier transform matrix of order N. The conventional Cooley-Tukey FFT is represented by a radix-2 decimation-in-frequency FFT equation for N=2M.

$$F(N) = \frac{1}{\sqrt{2}} P^t(N) \begin{bmatrix} F(M) & 0 \\ 0 & F(M) \end{bmatrix} \begin{bmatrix} I(M) & 0 \\ 0 & Q(M) \end{bmatrix} \begin{bmatrix} I(M) & I(M) \\ I(M) & -I(M) \end{bmatrix}$$

In the conventional Cooley-Tukey radix-2 decimation-in-frequency FFT equation, superscript t denotes transpose only, and Q(M) is a diagonal matrix defined by the FFT twiddle factor equation $$Q(M) = Diag\{W_{2M}^n; n = 1, 2, \ldots, M-1\}$$

with $W_M = \text{Exp}[-j(2\pi/M)]$. The diagonal elements of Q(M) are the twiddle factors. The matrix P(N) is the permutation matrix to bring the even numbered elements to the upper half and the odd numbered to the lower half, and I(M) is the identity matrix. The Cooley-Tukey radix-2 decimation-in-frequency FFT algorithm is not a true radix-2 transform because it consists of two lower-order FFTs of the complex weighted sum of each half of the input. In the radix-2 decimation-in-frequency FFT equation, the twiddle factors Q are on the right hand-side of F(M). A true radix-2 decimation-in-frequency FFT uses the orthonormal property of Fourier transform, that is, $F^+(M)F(M)=I(M)$, having identity matrix I(M). The conventional radix-2 decimation-in-frequency FFT equation can be converted into a true radix-2 decimation-in-frequency FFT equation.

$$F(N) = \frac{1}{\sqrt{2}} P^t(N) \begin{bmatrix} I(M) & 0 \\ 0 & R(M) \end{bmatrix} \begin{bmatrix} I(M) & I(M) \\ I(M) & -I(M) \end{bmatrix} \begin{bmatrix} F(M) & 0 \\ 0 & F(M) \end{bmatrix}$$

Figure 1A:
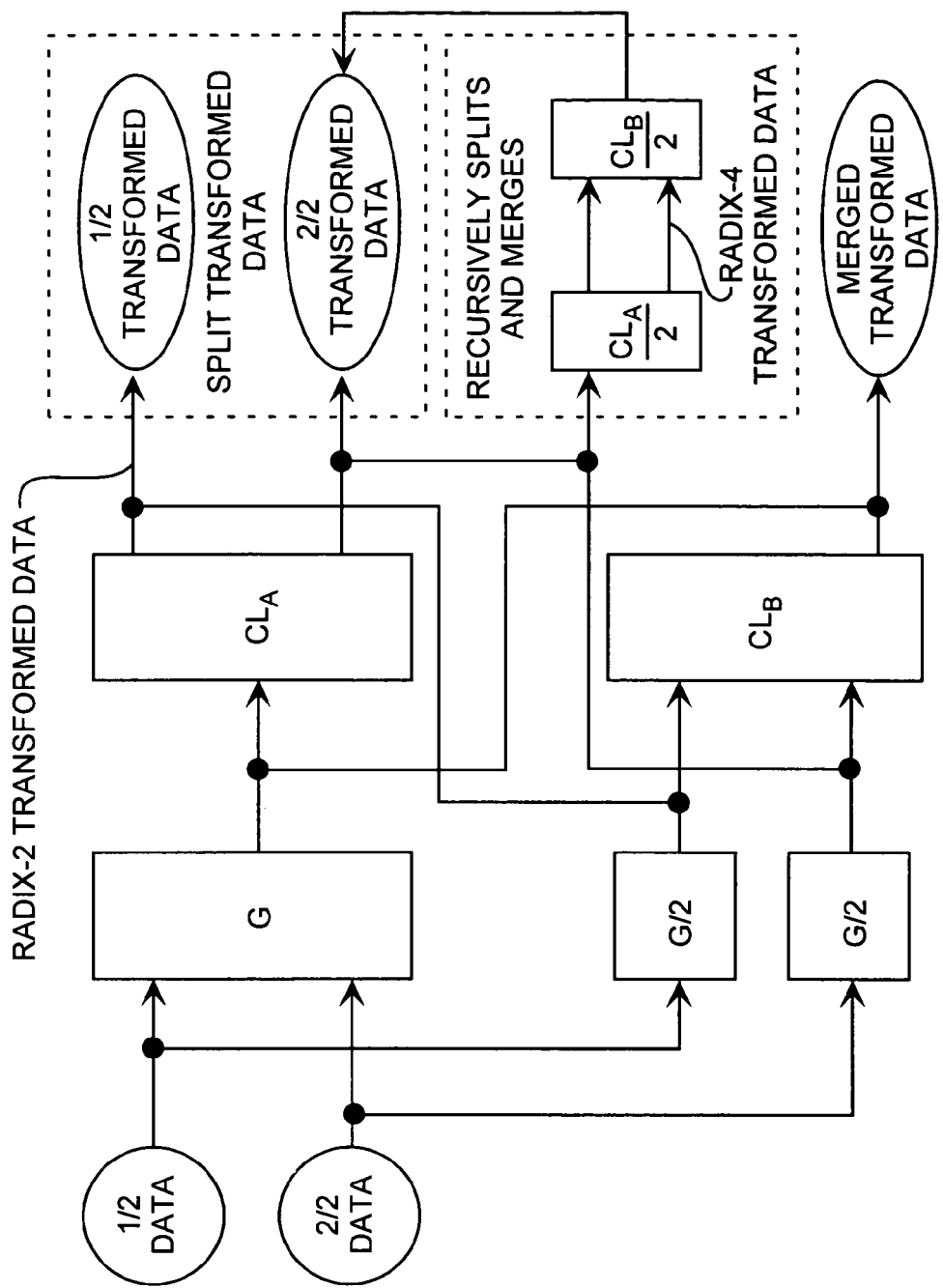
FIG. 1A is a block diagram of a lossless true merge and split general block transform process.
Figure 1B:
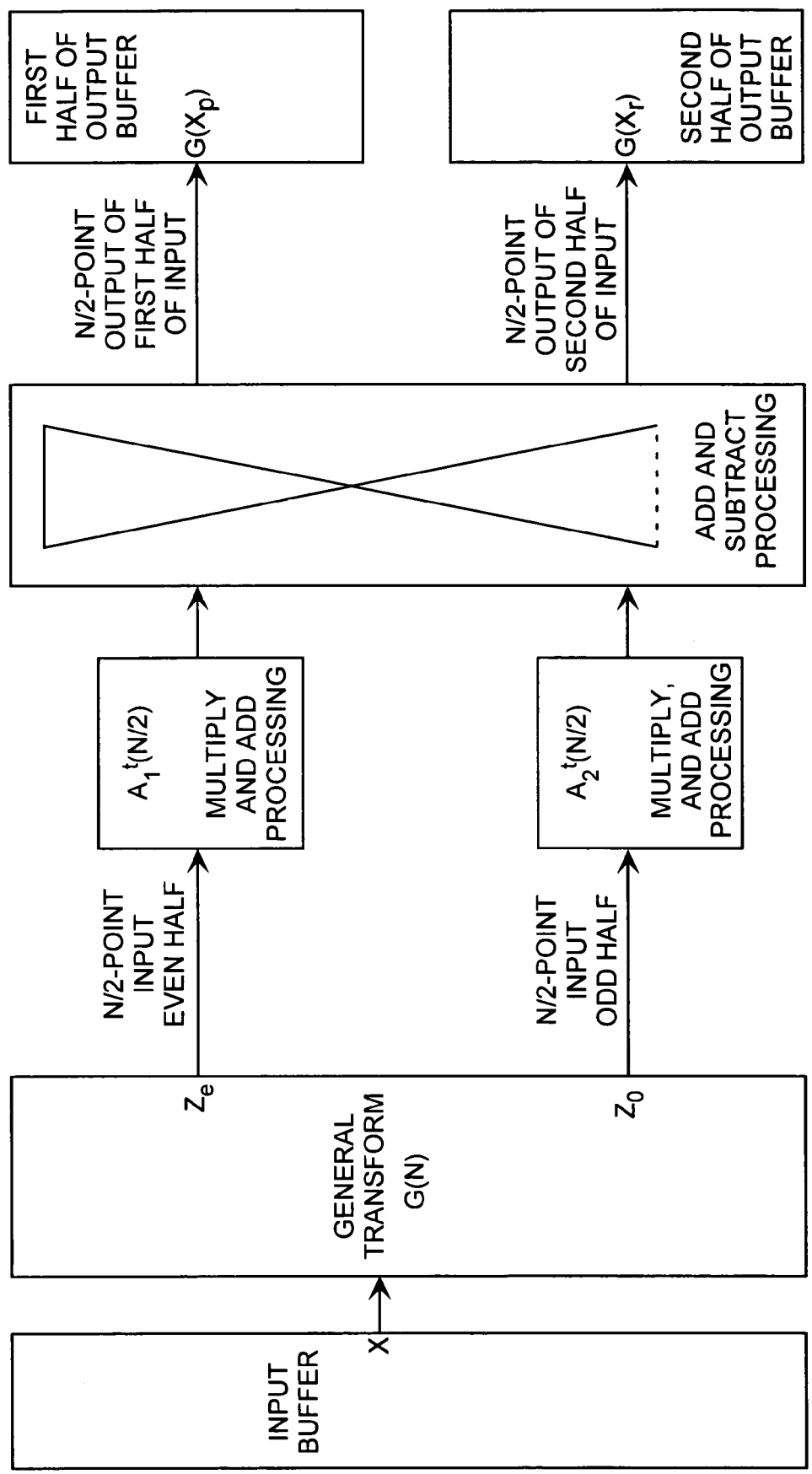
FIG. 1B is a block diagram of an Nth order GBT split block process.
Figure 1C:
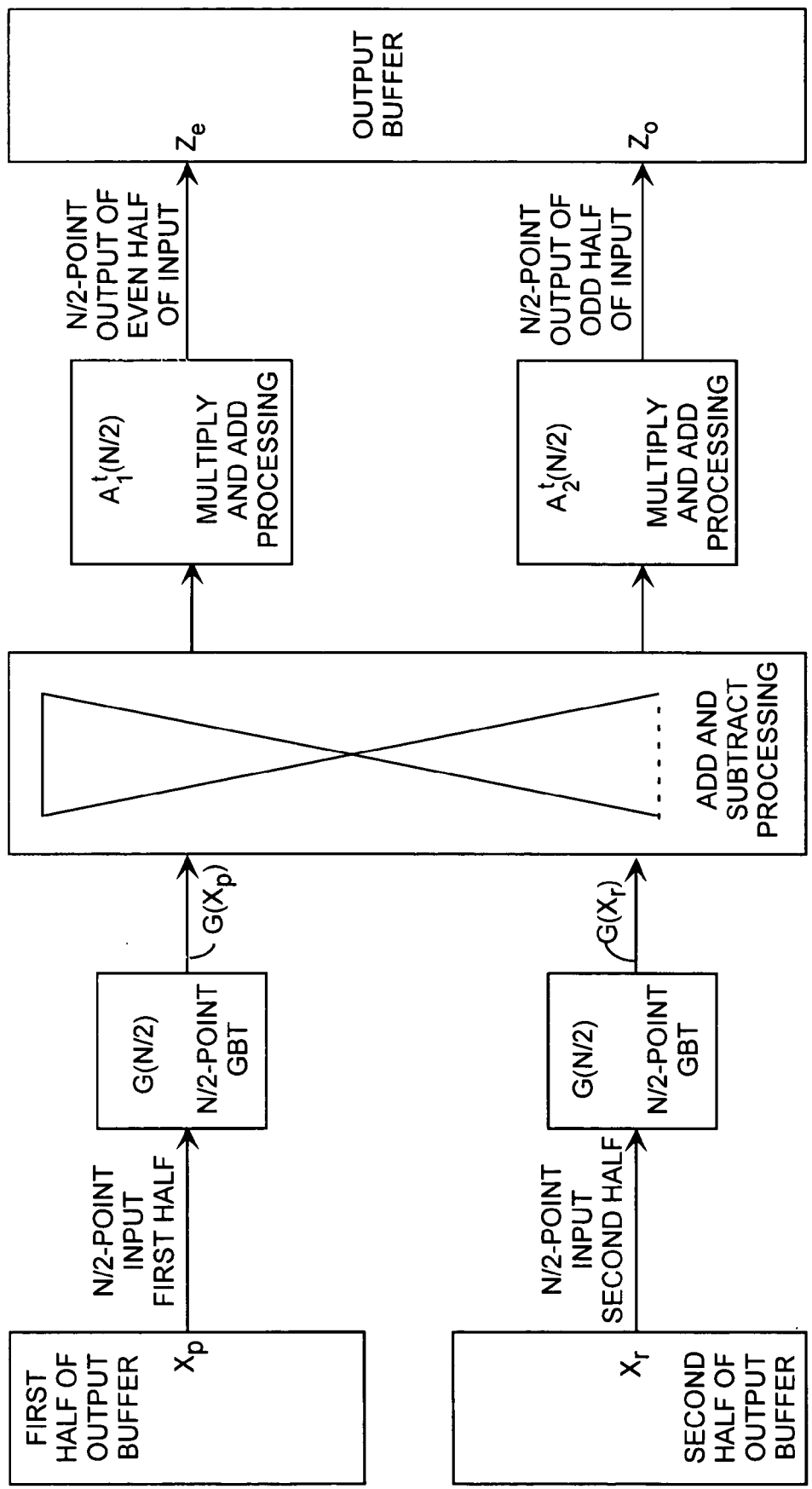
FIG. 1C is a block diagram of an Nth order GBT merge block process
Figure 2A:
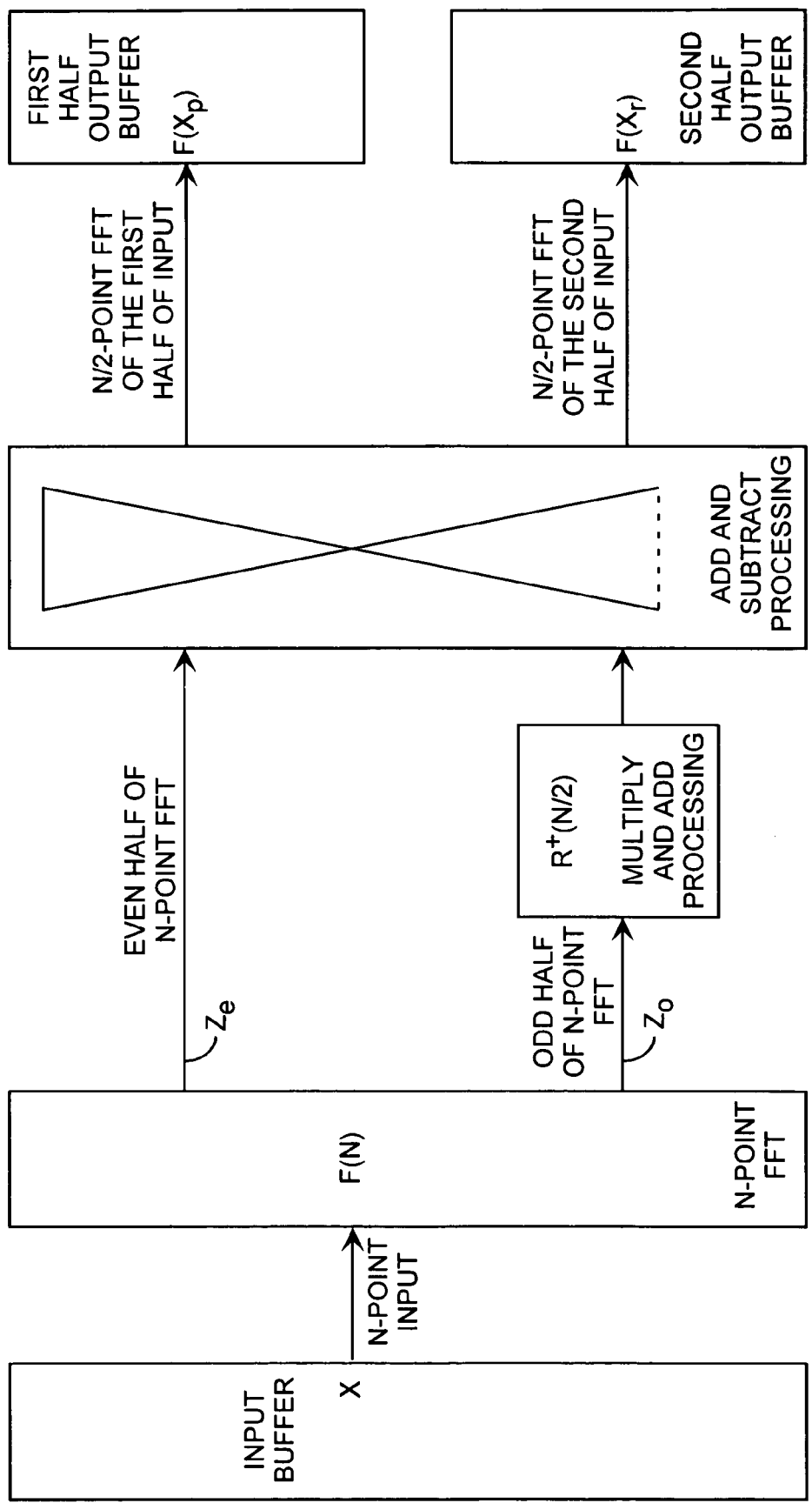
FIG. 2A is a block diagram of an Nth order radix-2 FFT split block process.
Figure 8:
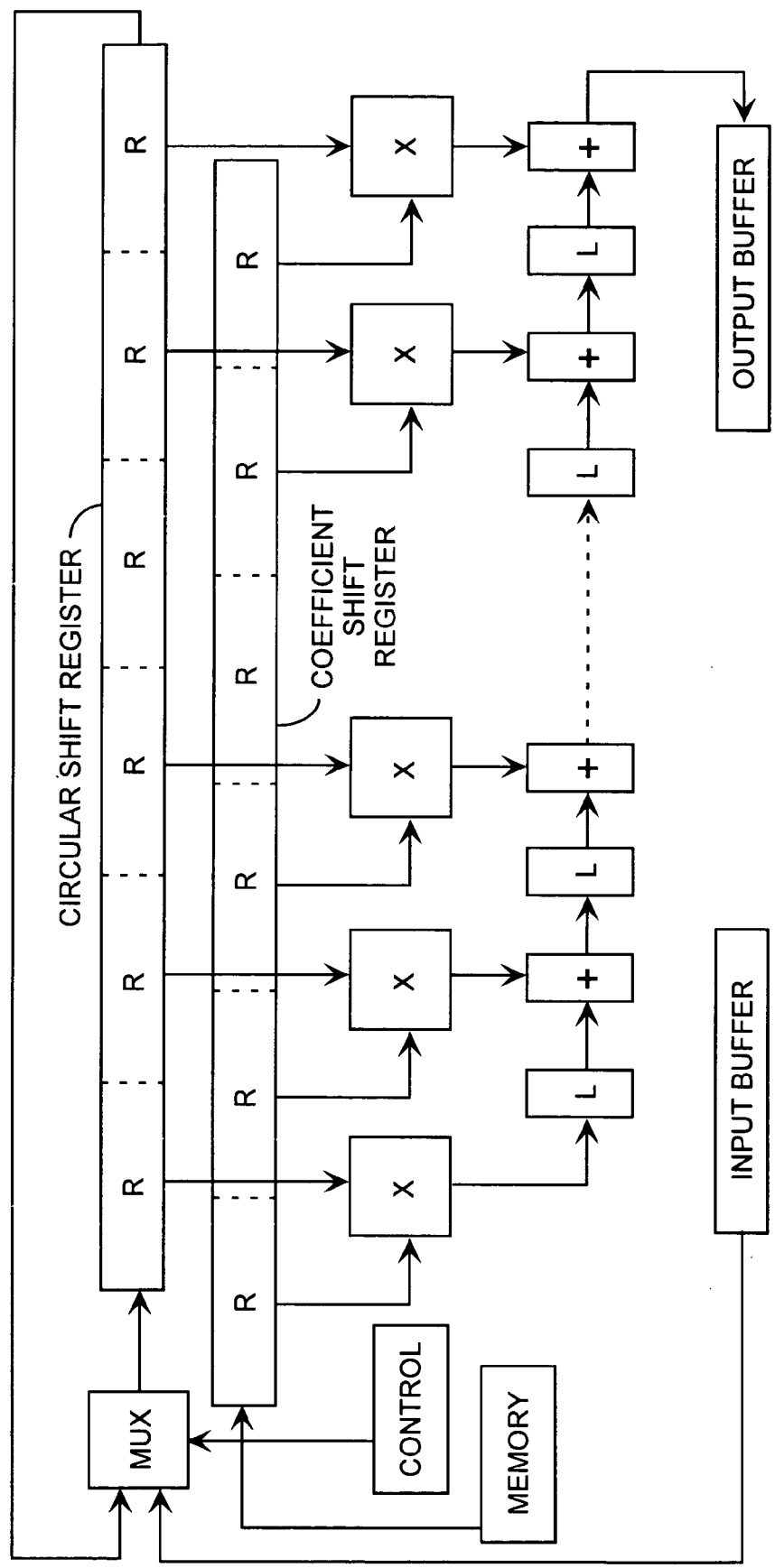
FIG. 8 is a block diagram of an FIR transversal filter.

In the true radix-2 decimation-in-frequency FFT equation, R(M) is defined by an FFT R(M) equation R(M)=F(M)Q(M)F$^+$(M), where the superscript+represents a conjugate transpose. R(M) is a circulant matrix and represents a circular convolution in the Fourier transform domain. An implementation of the circular convolution operations is shown in FIG. 8. The true radix-2 decimation-in-frequency FFT equation indicates the architecture of merging two lower-order FFTs into the next higher-order FFT which may be performed completely in the FFT domain. The merge block process based on the true radix-2 decimation-in-frequency FFT equation is shown in FIG. 2C. The R(M) in the true radix-2 decimation-in-frequency FFT equation is also recursive. By substituting the radix-2 decimation-in-time FFT equation into the R(M)=F(M)Q(M)F$^+$(M) equation, and using M=2L, a recursive FFT R(M) equation is found.

$$R(M) = \frac{1}{2} \begin{bmatrix} I(L) & I(L) \\ I(L) & -I(L) \end{bmatrix} \begin{bmatrix} I(L) & 0 \\ 0 & S(L) \end{bmatrix} \begin{bmatrix} R(L) & 0 \\ 0 & R(L) \end{bmatrix} \begin{bmatrix} I(L) & 0 \\ 0 & D^+(L) \end{bmatrix} \begin{bmatrix} I(L) & I(L) \\ I(L) & -I(L) \end{bmatrix}$$

In the recursive FFTR(M) equation, S(L)=D(L) $W_{2M} = Diag\{W^{k+0.5}_{2L}; k=1,2,\ldots,L-1\}$. As an example, the initial value of R(M) and the next higher-order R(M) are given by R(1)=1 and an R(2) equation.

$$R(2) = \frac{1}{2} \begin{bmatrix} 1 & 1 \\ 1 & -1 \end{bmatrix} \begin{bmatrix} 1 & 0 \\ 0 & -j \end{bmatrix} \begin{bmatrix} 1 & 1 \\ 1 & -1 \end{bmatrix} = \frac{1}{2} \begin{bmatrix} 1-j & 1+j \\ 1+j & 1-j \end{bmatrix}$$

Figure 2B:
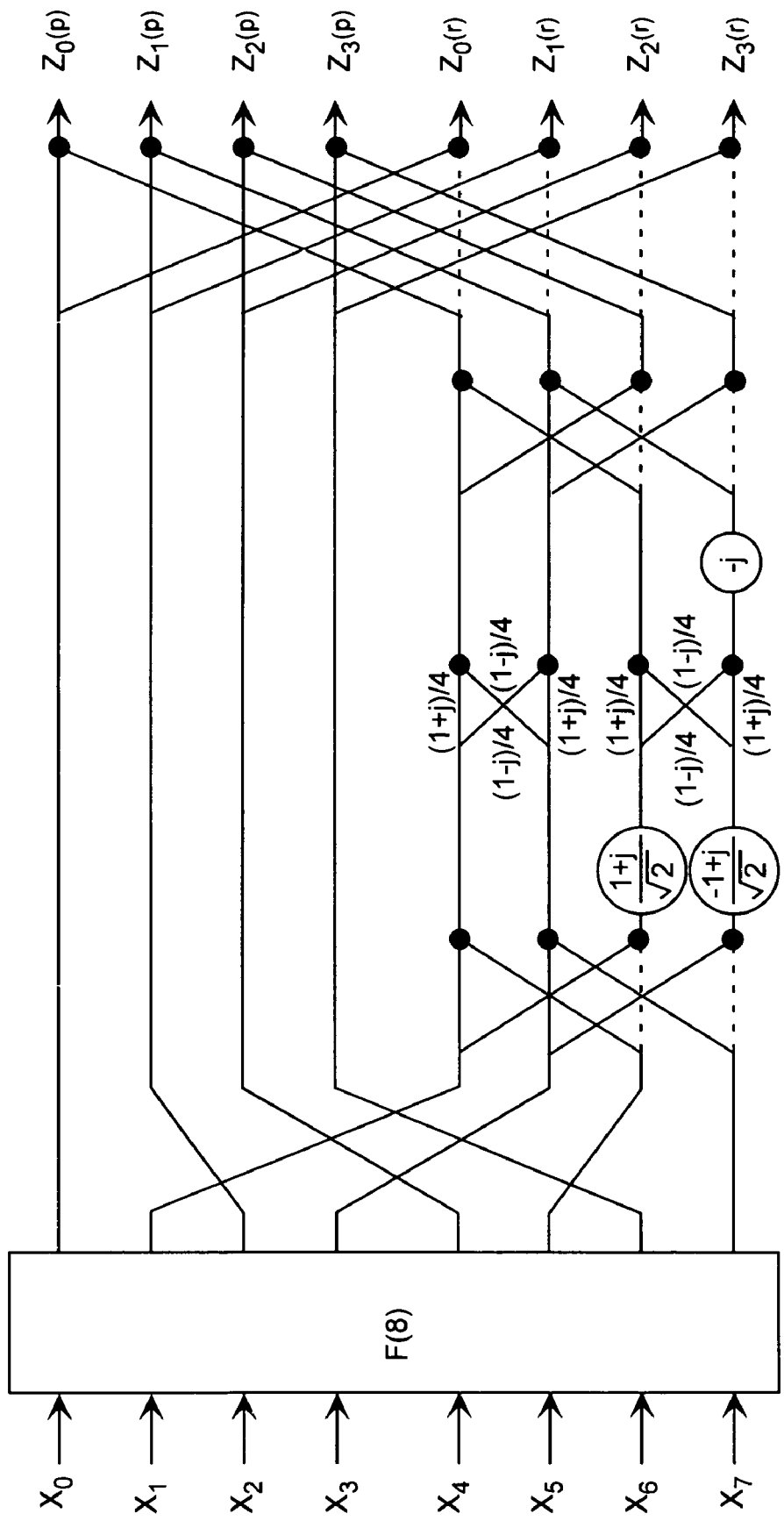
FIG. 2B is a block diagram of an 8th order radix-2 FFT split flow process.
Figure 2C:
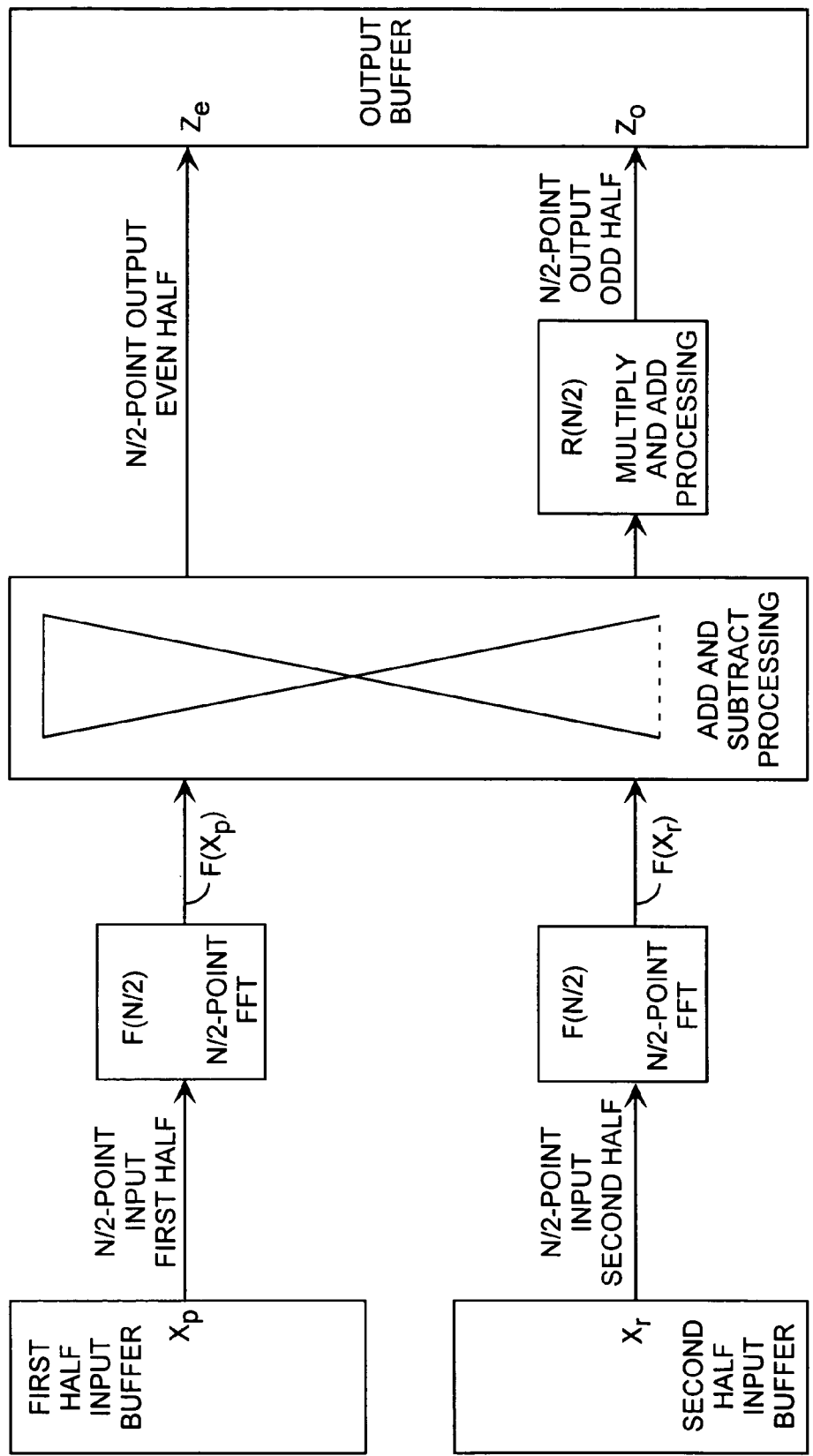
FIG. 2C is a flow diagram of an 8th order radix-2 FFT merge block process.
Figure 2D:
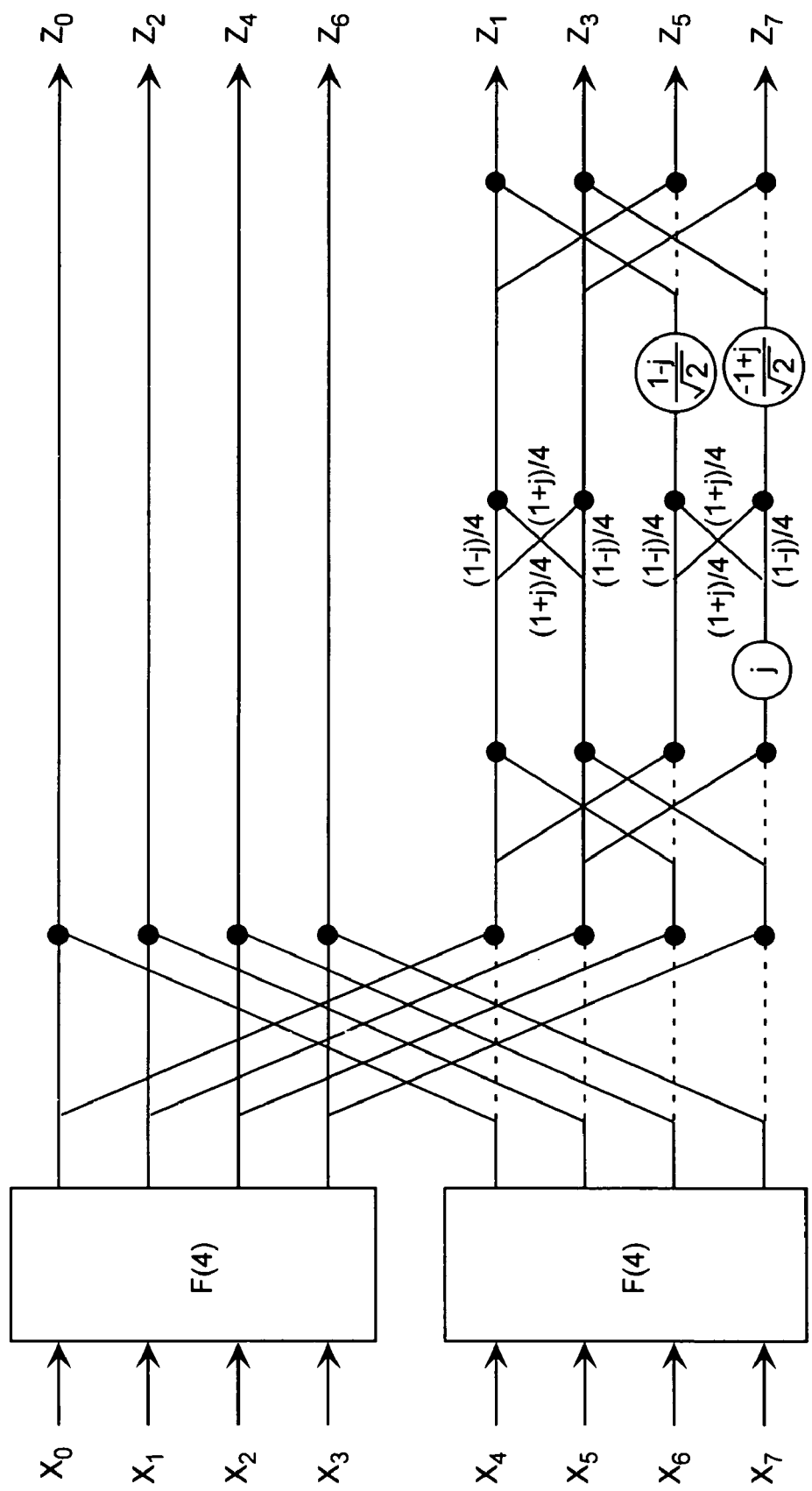
FIG. 2D is a flow diagram of an 8th order radix-2 FFT merge flow process.

By substituting this R(2) into the recursive FFT-R(M) equation, for M=4 and followed by substituting R(4) into the true radix-2 decimation-in-frequency FFT equation, an 8th-order FFT radix-2 merge flow process implementation is shown in FIG. 2D. For the purpose of splitting an FFT into two lower-order FFTs, the true radix-2 decimation-in-frequency FFT equation may be converted into a true split decimation-in-frequency FFT equation.

$$\begin{bmatrix} F(M) & 0 \\ 0 & F(M) \end{bmatrix} = \frac{1}{\sqrt{2}} \begin{bmatrix} I(M) & I(M) \\ I(M) & -I(M) \end{bmatrix} \begin{bmatrix} I(M) & 0 \\ 0 & R^+(M) \end{bmatrix} P(N)F(N)$$

Again, R$^+$(M) is recursive and circulant. The split block process based on the true split decimation-in-frequency FFT equation is shown in FIG. 2A and the 8th-order FFT radix-2 split flow process is shown in FIG. 2D. The true radix-2 decimation-in-frequency FFT algorithm enables a true splitting and a true merging completely in the FFT domain. The basic building blocks of the algorithm are two lower-order FFTs, each of which is the true FFT of the half of the input data.

Referring to FIG. 2A, that shows an Nth-order radix-2 FFT split block process, time or spatial data is fed into an N-point FFT. The even half of the FFT output is then fed into the add and subtract processing, whereas the odd half of the FFT output is firstly fed into the multiply and add processing unit then into the add and subtract processing. The upper-half output from the add and subtract processing is the N/2-point FFT of the first half of the original input data. The lower-half output from the add and subtract processing is the N/2-point FFT of the second half of the original input data. Thus, the N-point FFT block output has been successfully split into two N/2-point FFT data blocks.

Referring to FIG. 2B, that shows an 8th-order radix-2 FFT split flow process, time or spatial data is fed into an 8-point FFT. The even half of the FFT output is then fed into the add and subtract processing, whereas the odd half of the FFT output is firstly fed into the multiply and add processing unit then into the add and subtract processing. The upper half output from the add and subtract processing is the 4-point FFT of the first half of the original data. The lower half output from the add and subtract processing unit is the 4-point FFT of the second half of the original data. Thus, the 8-point FFT output has been successfully split into two 4-point FFT data.

Referring to FIG. 2C, that shows an Nth-order radix-2 FFT merge block process, two halves of time or spatial data are respectively fed into two N/2-point FFT blocks. The first FFT block output is then fed into the add and subtract processing, whereas the second FFT block output is firstly fed into the add and subtract processing then into the multiply and add processing. The upper half output from the add and subtract processing is the even-point FFT of the original data. The output from the multiply and add processing is the odd-point FFT of the original data. Thus, two N/2-point FFT block outputs have been successful merged into an N-point FFT data block.

Referring to FIG. 2D, that shows an 8th-order radix-2 FFT merge flow process, two halves of time or spatial data are respectively fed into two 4-point FFT blocks. The first FFT block output is then fed into the add and subtract processing, whereas the second FFT block output is firstly fed into the add and subtract processing and then into the multiply and add processing. The upper half output from the add and subtract processing is the even-point FFT of the original data. The output from the multiply and add processing is the odd-point FFT of the original data. Thus, two 4-point FFT outputs have been successful merged into an 8-point FFT data.

Fast Hartley Transforms (FHT)

Referring to FIGS. 3A through 3D, the Discrete Hartley transform (DHT) in one dimension is defined by the DHT equation.

$$z(k) = \frac{1}{\sqrt{N}} \sum_{n=0}^{N-1} [\cos(2\pi nk/N) + \sin(2\pi nk/N)]x(n)$$

The fast Hartley transform (FHT) in one dimension is represented by the linear equation $z=H(N)x$, where x is the input vector with elements $\{x_n; n=0,1,2,\ldots, N-1\}$ and z is the output vector with elements $\{z_k; k=0,1,2,\ldots, N-1\}$. All the elements in both x and z are arranged in natural order. H(N) is the orthonormal Hartley transform matrix of order N. The prior art radix-2 decimation-in-frequency FHT is given by a prior art radix-2 decimation-in-frequency FHT equation for N=2M.

$$H(N) = \frac{1}{\sqrt{2}} P^t(N) \begin{bmatrix} H(M) & 0 \\ 0 & H(M) \end{bmatrix} \begin{bmatrix} I(M) & 0 \\ 0 & K(M) \end{bmatrix} \begin{bmatrix} I(M) & I(M) \\ I(M) & -I(M) \end{bmatrix}$$

In the prior art radix-2 decimation-in-frequency FHT equation, superscript t denotes transpose only, and K(M) is defined by a FHT twiddle factor equation $K(M)=\text{Diag}(\cos \phi_n) P^{\#}(M)$ with $\phi_n = 2\pi n/N$ and with $P^{\#}$ defined by a $P^{\#}$ equation. The matrix P(N) is the permutation matrix to bring the even numbered elements to the upper half and the odd numbered to the lower half, and I(M) is the identity matrix.

$$P^{\#} = \begin{bmatrix} 1 & & & & & \\ & & & & & 1 \\ & & & & 1 & \\ & & & 1 & & \\ & & \cdot & & & \\ & \cdot & & & & \\ & 1 & & & & \\ 1 & & & & & \end{bmatrix}$$

The prior art radix-2 decimation-in-frequency FHT algorithm is not a true radix-2 because it consists of two lower-order FHTs of the weighted sum of each half of the input. In the radix-2 decimation-in-frequency FHT equation, the twiddle factors K are on the right hand-side of H(M). A true radix-2 decimation-in-frequency FHT uses the orthonormal property of Hartley transform, that is, $H^t(M) H(M)=I(M)$, having identity matrix I(M). The conventional radix-2 decimation-in-frequency FHT equation can be converted into a true radix-2 decimation-in-frequency FHT equation.

$$H(N) = \frac{1}{\sqrt{2}} P^t(N) \begin{bmatrix} I(M) & 0 \\ 0 & R(M) \end{bmatrix} \begin{bmatrix} I(M) & I(M) \\ I(M) & -I(M) \end{bmatrix} \begin{bmatrix} H(M) & 0 \\ 0 & H(M) \end{bmatrix}$$

Figure 3A:
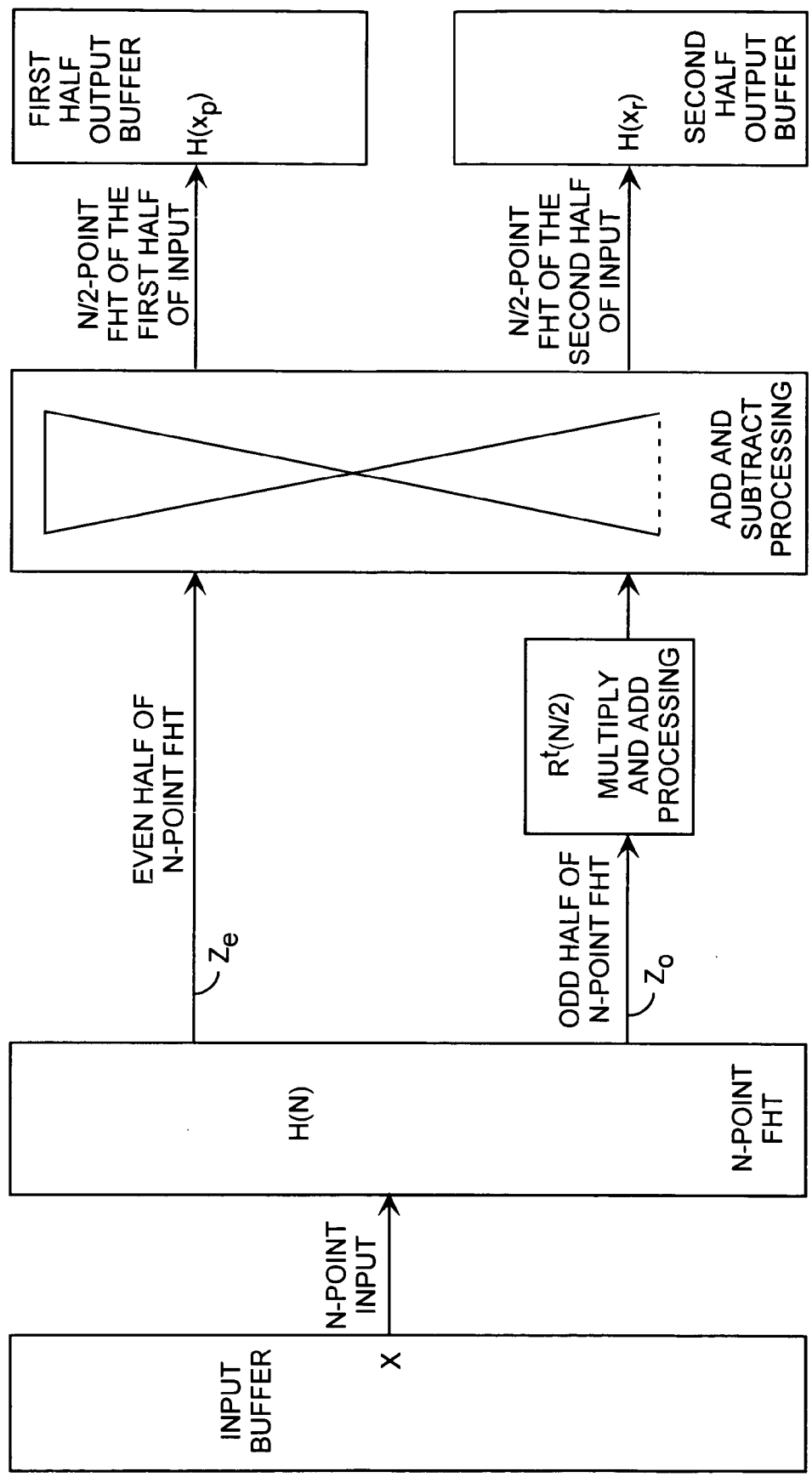
FIG. 3A is a block diagram of an Nth order radix-2 FHT split block process.
Figure 3B:
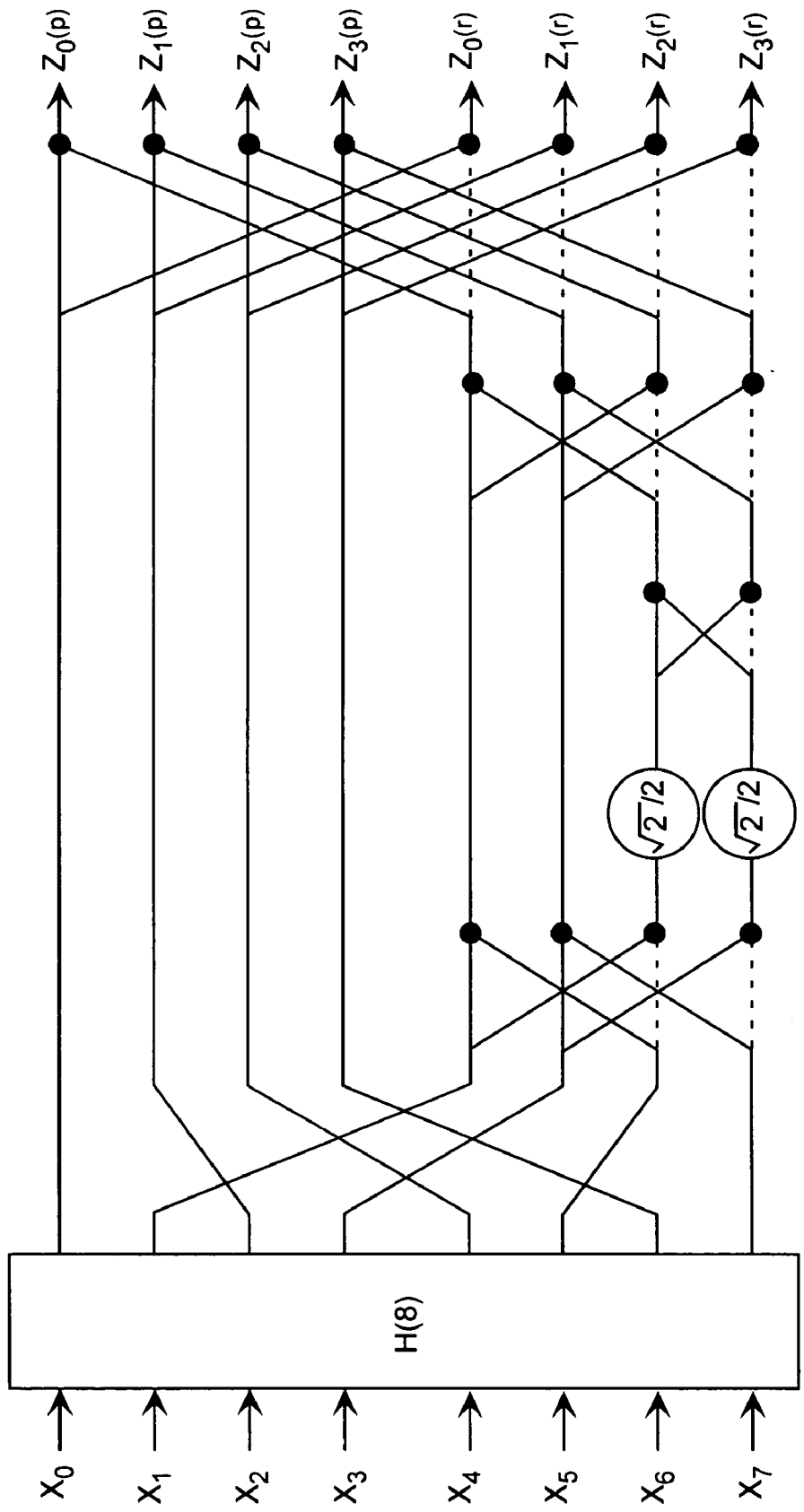
FIG. 3B is a block diagram of an 8th order radix-2 FHT split flow process.
Figure 3C:
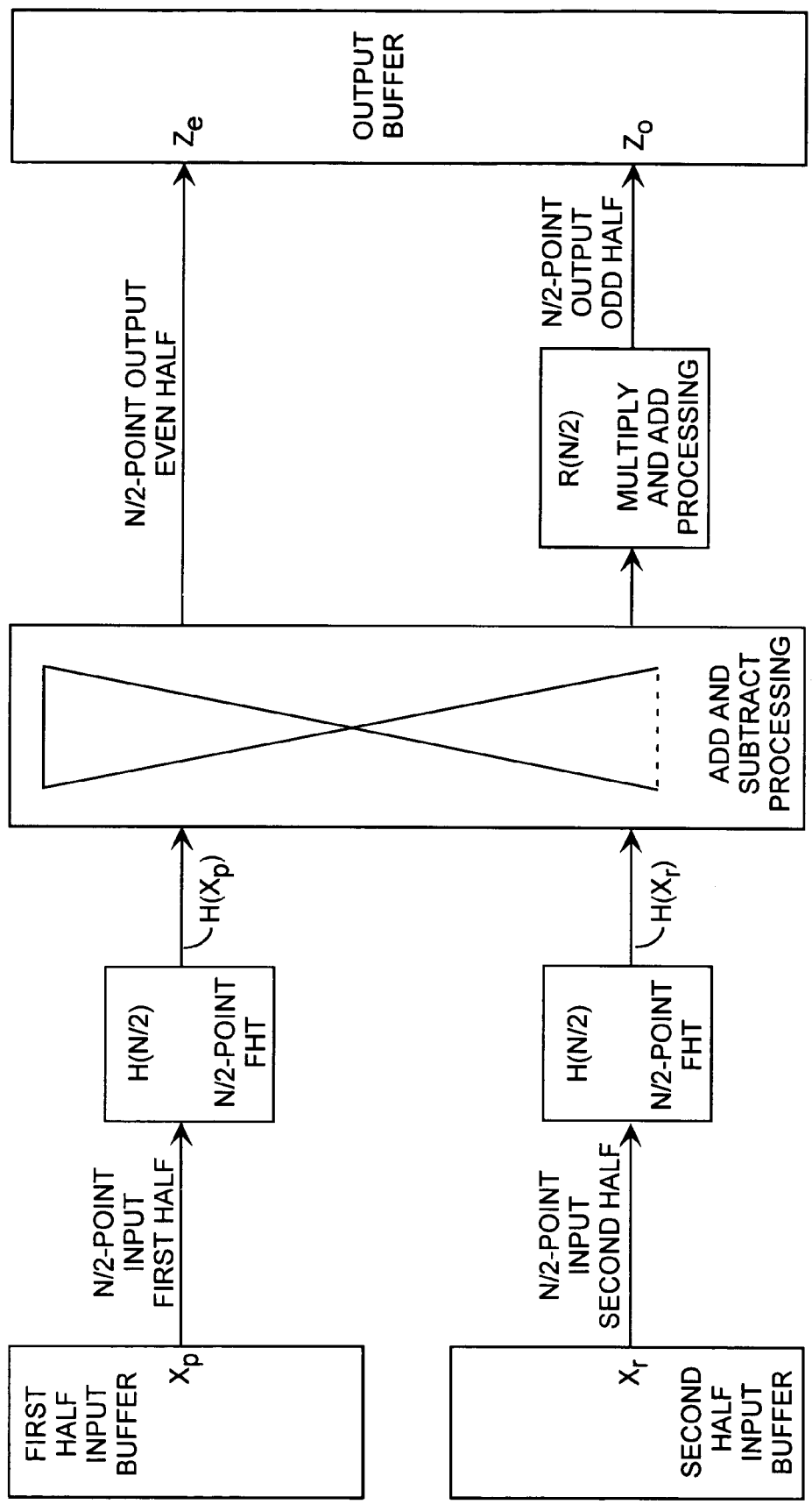
FIG. 3C is a flow diagram of an 8th order radix-2 FHT merge block process.

In the true radix-2 decimation-in-frequency FHT equation, R(M) is defined by an FHT rotation equation $R(M)=H(M)K(M)H^t(M)$. Due to the fact that R(M) is a circulant matrix, R(M) represents a circular convolution in the Hartley transform domain. The implementation of the circular convolution operations is shown in FIG. 8. The true radix-2 decimation-in-frequency FHT equation indicates the architecture of merging two lower-order FHTs into the next higher-order FHT that may be performed completely in the FHT domain. The merge block process based on the true radix-2 decimation-in-frequency FHT equation is shown in FIG. 3C. The R(M) in the true radix-2 decimation-in-frequency FHT equation is also recursive. By substituting the radix-2 decimation-in-time FHT equation into the R(M) $=H(M)K(M)H^t(M)$ equation, and using M=2L, a recursive FHT R(M) equation is found.

$$R(M) = \frac{1}{2} \begin{bmatrix} I(L) & I(L) \\ I(L) & -I(L) \end{bmatrix} \begin{bmatrix} I(L) & 0 \\ 0 & D(L) \end{bmatrix} \begin{bmatrix} R(L) & 0 \\ 0 & R(L) \end{bmatrix} \begin{bmatrix} I(L) & 0 \\ 0 & K^+(L) \end{bmatrix}$$

$$\begin{bmatrix} I(L) & I(L) \\ I(L) & -I(L) \end{bmatrix}$$

In the recursive FHT R(M) equation, D(L) is defined as $D(L)=\text{Diag}(\cos \theta_n)+\text{Diag}(\sin \theta_n)J$ for $n=0,1,2,\ldots,L-1$, with $\theta=\pi(2n+1)/M$ and J being the antidiagonal identity matrix. The two lower order FHT can be described by as an H(2) equation where $\alpha=\sqrt{2}/2$, and an H(4) equation.

$$H(2) = \begin{bmatrix} \alpha & \alpha \\ \alpha & -\alpha \end{bmatrix}$$

-continued $$H(4) = \frac{1}{2}\begin{bmatrix} 1 & 1 & 1 & 1 \\ 1 & 1 & -1 & -1 \\ 1 & -1 & 1 & -1 \\ 1 & -1 & -1 & 1 \end{bmatrix}$$

For the case N=8, then M=4 and L=2, K(2)=I, and R(2)=I, with D(2) defined by a D(2) equation.

$$D(2) = \begin{bmatrix} \alpha & \alpha \\ \alpha & -\alpha \end{bmatrix}$$

Substituting H(2), H(4) and D(2) into the recursive FHT R(M) equation can produce an R(4) equation.

$$R(4) = \frac{1}{2}\begin{bmatrix} 1+\alpha & \alpha & 1-\alpha & -\alpha \\ \alpha & 1-\alpha & -\alpha & 1+\alpha \\ 1-\alpha & -\alpha & 1+\alpha & \alpha \\ -\alpha & 1+\alpha & \alpha & 1-\alpha \end{bmatrix}$$

Figure 3D:
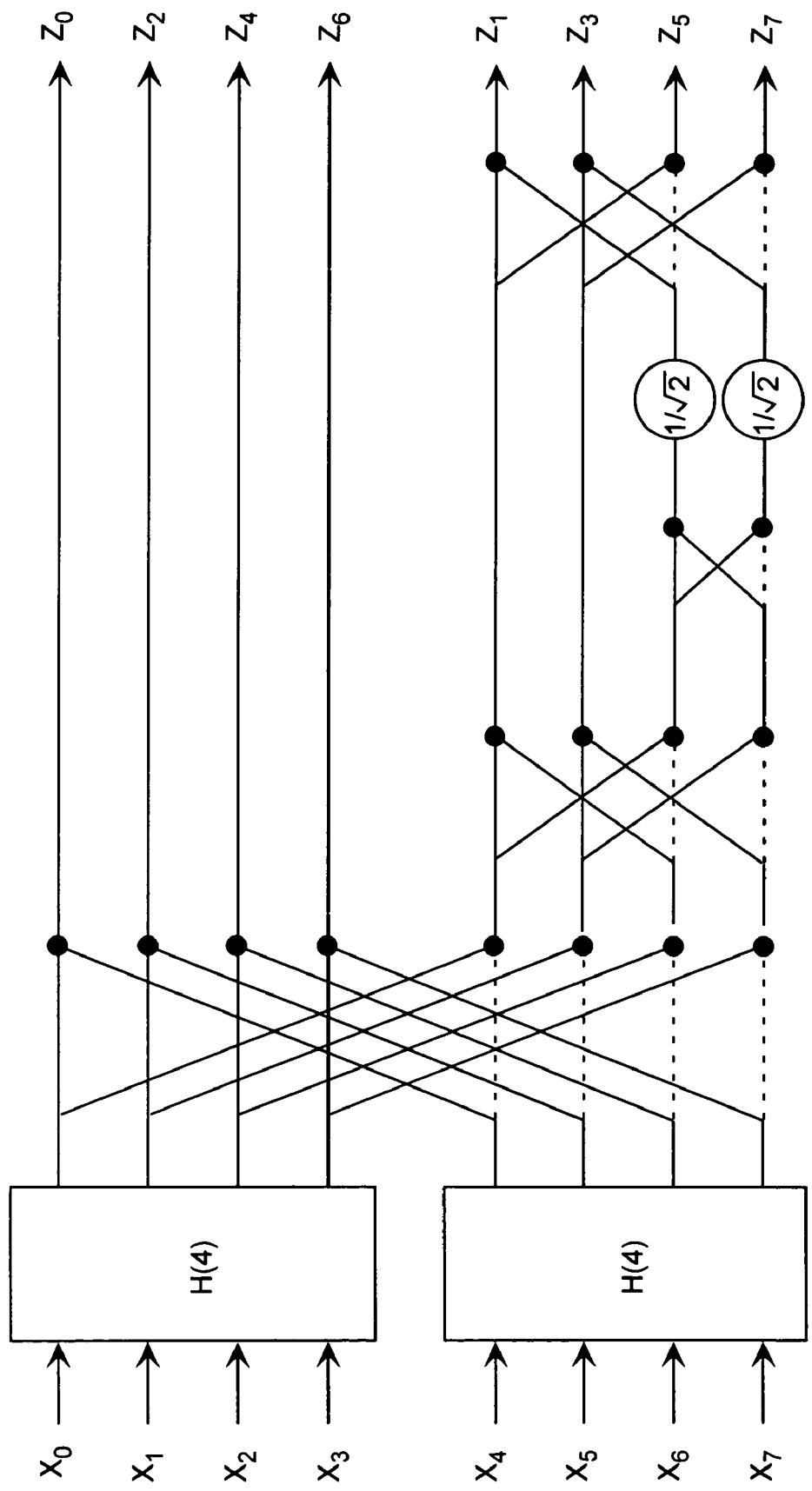
FIG. 3D is a flow diagram of an 8th order radix-2 FHT merge flow process.

By substituting this R(4) equation into the true radix-2 decimation-in-frequency FHT equation for M=4, an 8th-order FHT radix-2 merge flow process is shown in FIG. 3D. For the purpose of splitting an FHT into two lower-order FHTs, the true radix-2 decimation-in-frequency FHT equation may be converted into a true split decimation-in-frequency FHT equation.

$$\begin{bmatrix} H(M) & 0 \\ 0 & H(M) \end{bmatrix} = \frac{1}{\sqrt{2}}\begin{bmatrix} I(M) & I(M) \\ I(M) & -I(M) \end{bmatrix}\begin{bmatrix} I(M) & 0 \\ 0 & R^+(M) \end{bmatrix}P(N)H(N)$$

Again R$^+$(M) is recursive and circulant. The split block process based on the true split decimation-in-frequency FHT equation is shown in FIG. 3A and the 8th-order FHT radix-2 split flow process is shown in FIG. 3B. The true radix-2 decimation-in-frequency FHT algorithm enables a true splitting and a true merging completely in the FHT domain. The basic building blocks of the algorithm are two lower-order FHTs, each of which is the true FHT of the half of the input data.

Referring to FIG. 3A, that shows an Nth-order radix-2 FHT split block process, time or spatial data is fed into an N-point FHT. The even half of the FHT output is then fed into the add and subtract processing, whereas the odd half of the FHT output is firstly fed into the multiply and add processing then into the add and subtract processing. The upper-half output from the add and subtract processing is the N/2-point FHT of the first half of the original data. The lower-half output from the add and subtract processing is the N/2-point FHT of the second half of the original data. Thus, the N-point FHT block output has been successfully split into two N/2-point FHT data blocks.

Referring to FIG. 3B, that shows an 8th-order radix-2 FHT split flow process, time or spatial data is fed into an 8-point FHT. The even half of the FHT output is then fed into the add and subtract processing, whereas the odd half of the FHT output is firstly fed into the multiply and add processing and then into the add and subtract processing. The upper half output from the add and subtract processing is the 4-point FHT of the first half of the original data. The lower half output from the add and subtract processing is the 4-point FHT of the second half of the original data. Thus, the 8-point FHT output has been successfully split into two 4-point FHT data.

Referring to FIG. 3C, that shows an Nth-order radix-2 FHT merge block process, two halves of time or spatial data are respectively fed into two N/2-point FHT blocks. The first FHT block output is then fed into the add and subtract processing, whereas the second FHT block output is firstly fed into the add and subtract processing, and then into the multiply and add unit. The up half output from the add and subtract processing is the even-point FHT of the original data. The output from the multiply and add processing is the odd-point FHT of the original data. Thus, two N/2-point FHT block outputs have been successfully merged into an N-point FHT data block.

Referring to FIG. 3D, that shows an 8th-order radix-2 FHT merge flow process, two halves of time or spatial data are respectively fed into two 4-point FHT. The first FHT block output is then fed into the add and subtract processing, whereas the second FHT block output is firstly fed into the add and subtract processing, and then into the multiply and add processing. The upper half output from the add and subtract processing is the even-point FHT of the original data. The output from the multiply and add processing is the odd-point FHT of the original data. Thus, two 4-point FHT outputs have been successfully merged into an 8-point FHT data.

Discrete Cosine Transforms (DCT)

Referring to FIGS. 4A through 4D, the Discrete Cosine transform in one dimension is defined by the DCT definition equation $$z(k) = \sqrt{\frac{2}{N}}\varepsilon_k \sum_{n=0}^{N-1} x(n)\cos[(2n+1)k\pi/(2N)]$$

In the DCT definition equation, $\epsilon_k = 1/\sqrt{2}$ for k=0, and $\epsilon_k=1$ for k≠1. The Discrete Cosine transform in one dimension is represented by the linear equation z=T(N)x, where x is the input vector with elements $\{x_n; n=0,1,2,\ldots,N-1\}$ and z is the output vector with elements $\{z_k; k=0,1,2,\ldots,N-1\}$. All the elements in both x and z are arranged in natural order. T(N) is the orthonormal DCT matrix of order N. The prior art radix-2 decimation-in-frequency DCT equation for N=2M is given by a prior art radix-2 decimation-in-frequency DCT equation.

$$T(N) = \frac{1}{\sqrt{2}}P^t(N)\begin{bmatrix} T(M) & 0 \\ 0 & D(M) \end{bmatrix}\begin{bmatrix} I(M) & J(M) \\ I(M) & -J(M) \end{bmatrix}$$

In the prior art radix-2 decimation-in-frequency DCT equation, T(M) is the DCT type-II matrix of order M, D(M) is the DCT type-IV matrix of order M, and J is the anti-diagonal identity matrix. As the prior art radix-2 decimation-in-frequency DCT equation shows, the prior art radix-2 decimation-in-frequency DCT algorithm is not a true radix-2 decimation-in-frequency DCT algorithm because the D(M) is a DCT type-IV rather than the DCT type-II, T(M), and the second half of the input has to be rearranged in a reverse order by the operation of J(M). The prior art radix-2 decimation-in-frequency DCT equation is used to derive a true radix-2 decimation-in-frequency equation.

$$T(N) = \frac{1}{\sqrt{2}} P^t(N) \begin{bmatrix} I(M) & 0 \\ 0 & C(M) \end{bmatrix} \begin{bmatrix} I(M) & I^*(M) \\ I(M) & -I^*(M) \end{bmatrix} \begin{bmatrix} T(M) & 0 \\ 0 & T(M) \end{bmatrix}$$

In the true radix-2 decimation-in-frequency equation, $C(M)=D(M)T^t(M)$ with the superscript t denoting transpose only, and $I^*(M)=\text{Diag}(1,-1,1,-1,\ldots,1,-1)$. The $C(M)$ obeys a recursive DCT $C(N)$ equation.

$$C(N) = R_4(N) \begin{bmatrix} C(M) & 0 \\ 0 & C(M) \end{bmatrix} R_2^t(N)$$

In the DCT $C(N)$ equation, $R_2(N)$ and $R_4(N)$ are rotation matrices. For example, the case $M=4$ relates to a $C(4)$ equation.

$$C(4) = \begin{bmatrix} \lambda & 0 & 0 & \nu \\ 0 & \gamma & \mu & 0 \\ 0 & -\mu & \gamma & 0 \\ -\nu & 0 & 0 & \lambda \end{bmatrix} \begin{bmatrix} \beta & \delta & 0 & 0 \\ -\delta & \beta & 0 & 0 \\ 0 & 0 & \beta & \delta \\ 0 & 0 & -\delta & \beta \end{bmatrix} \begin{bmatrix} 1 & 0 & 0 & 0 \\ 0 & \beta & 0 & -\delta \\ 0 & 0 & 1 & 0 \\ 0 & \delta & 0 & \beta \end{bmatrix}$$

Figure 4A:
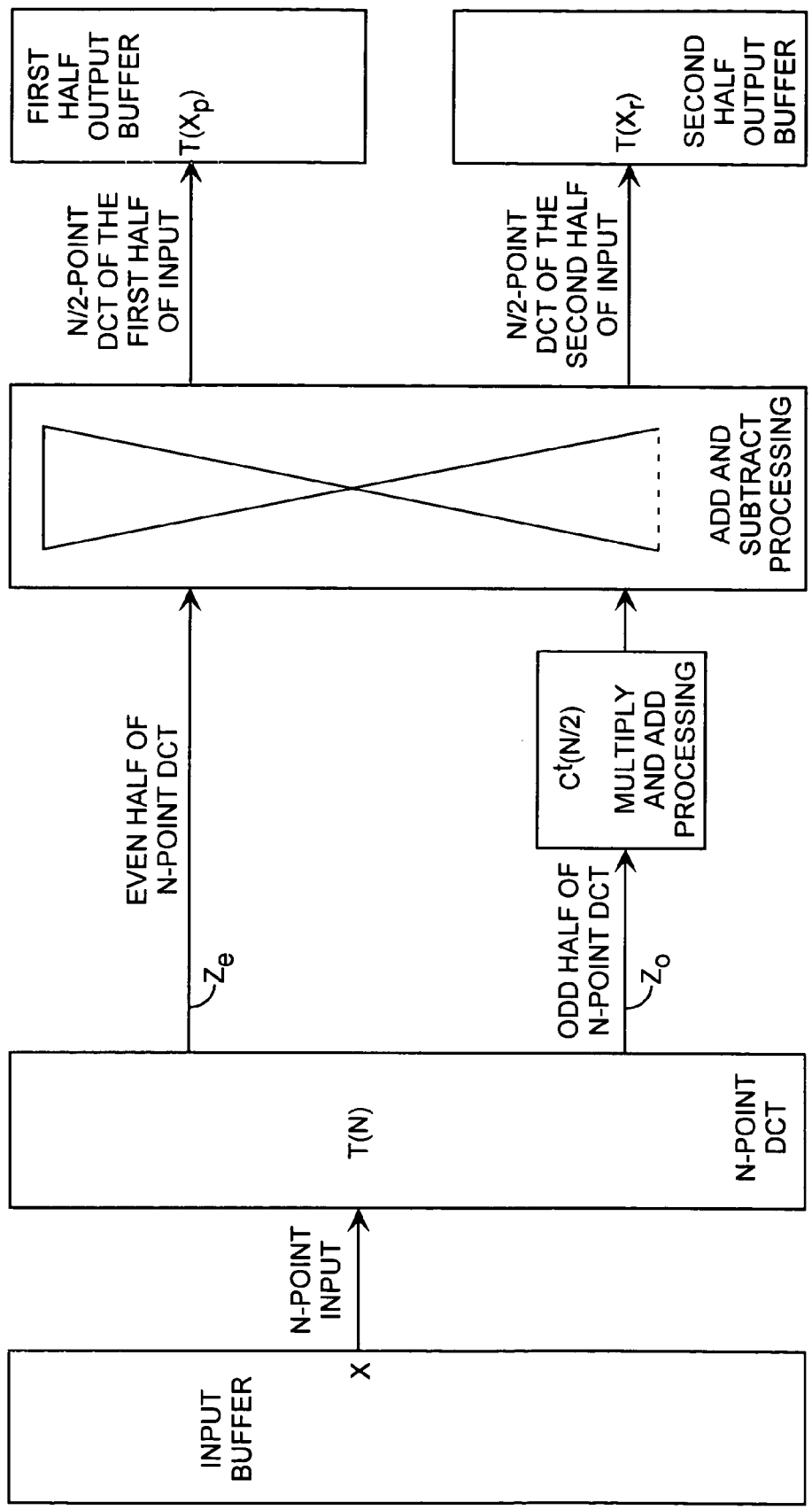
FIG. 4A is a block diagram of an Nth order radix-2 DCT split block process.
Figure 4B:
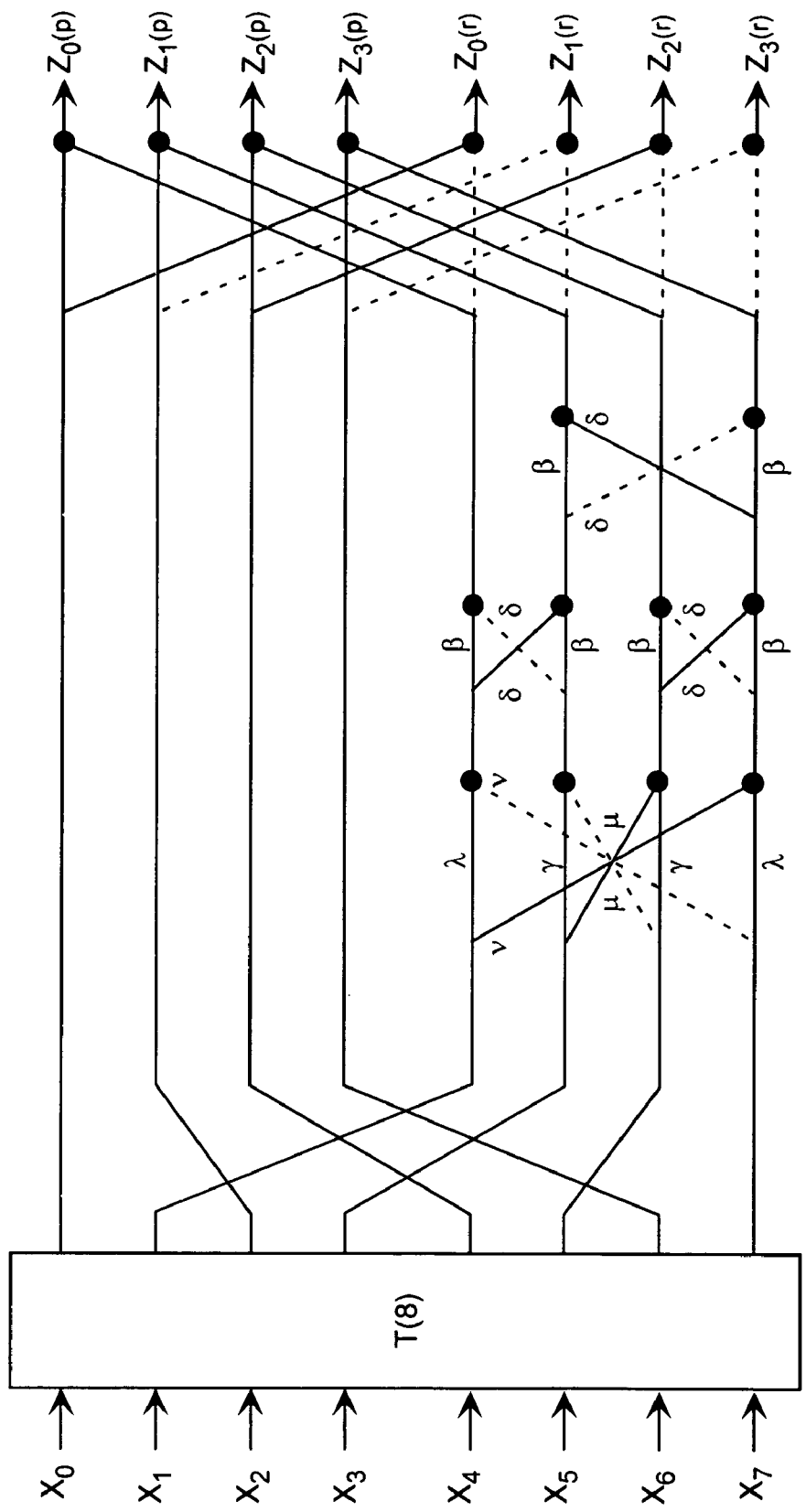
FIG. 4B is a block diagram of an 8th order radix-2 DCT split flow process.
Figure 4C:
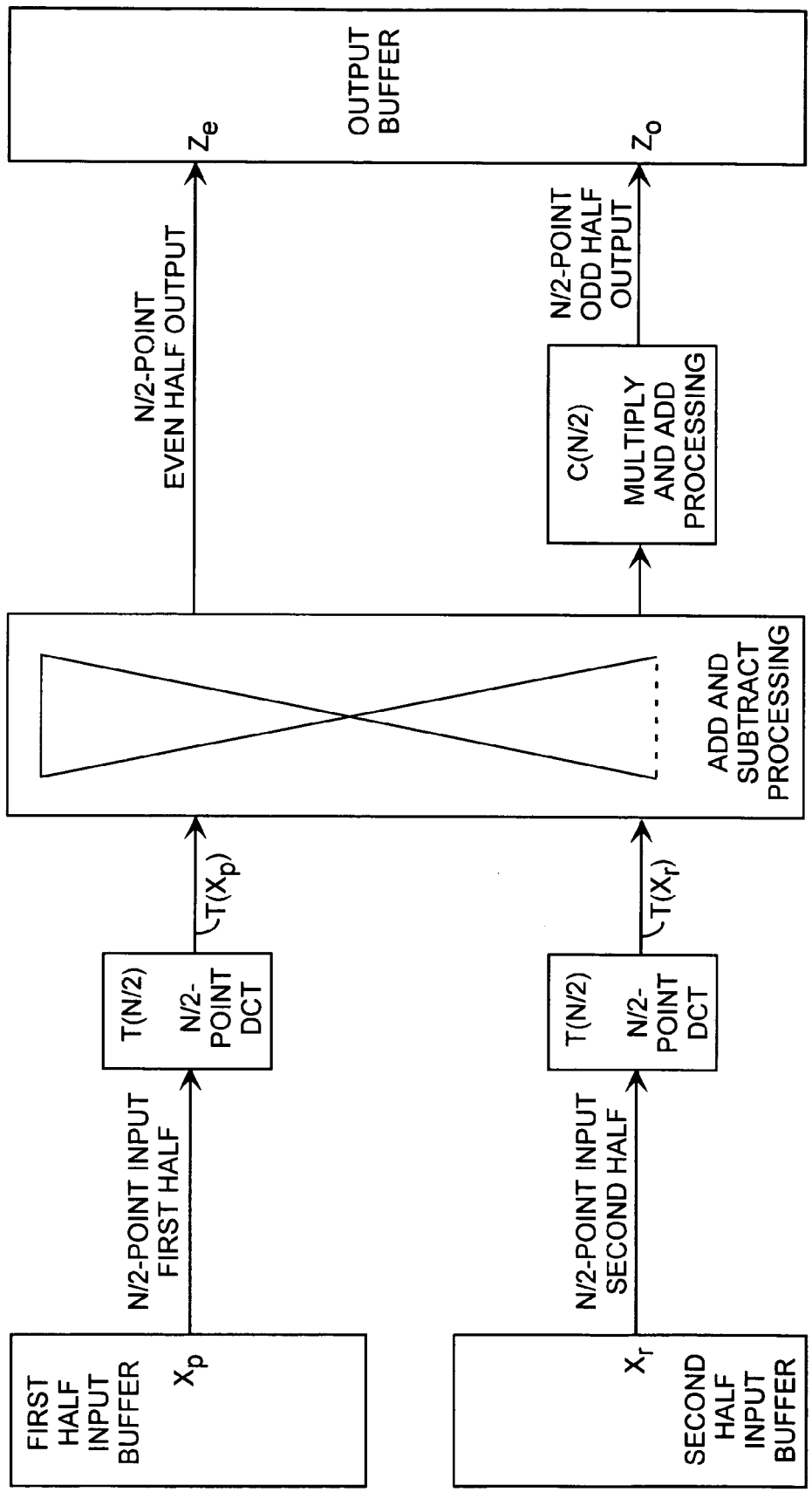
FIG. 4C is a flow diagram of an 8th order radix-2 DCT merge block process.
Figure 4D:
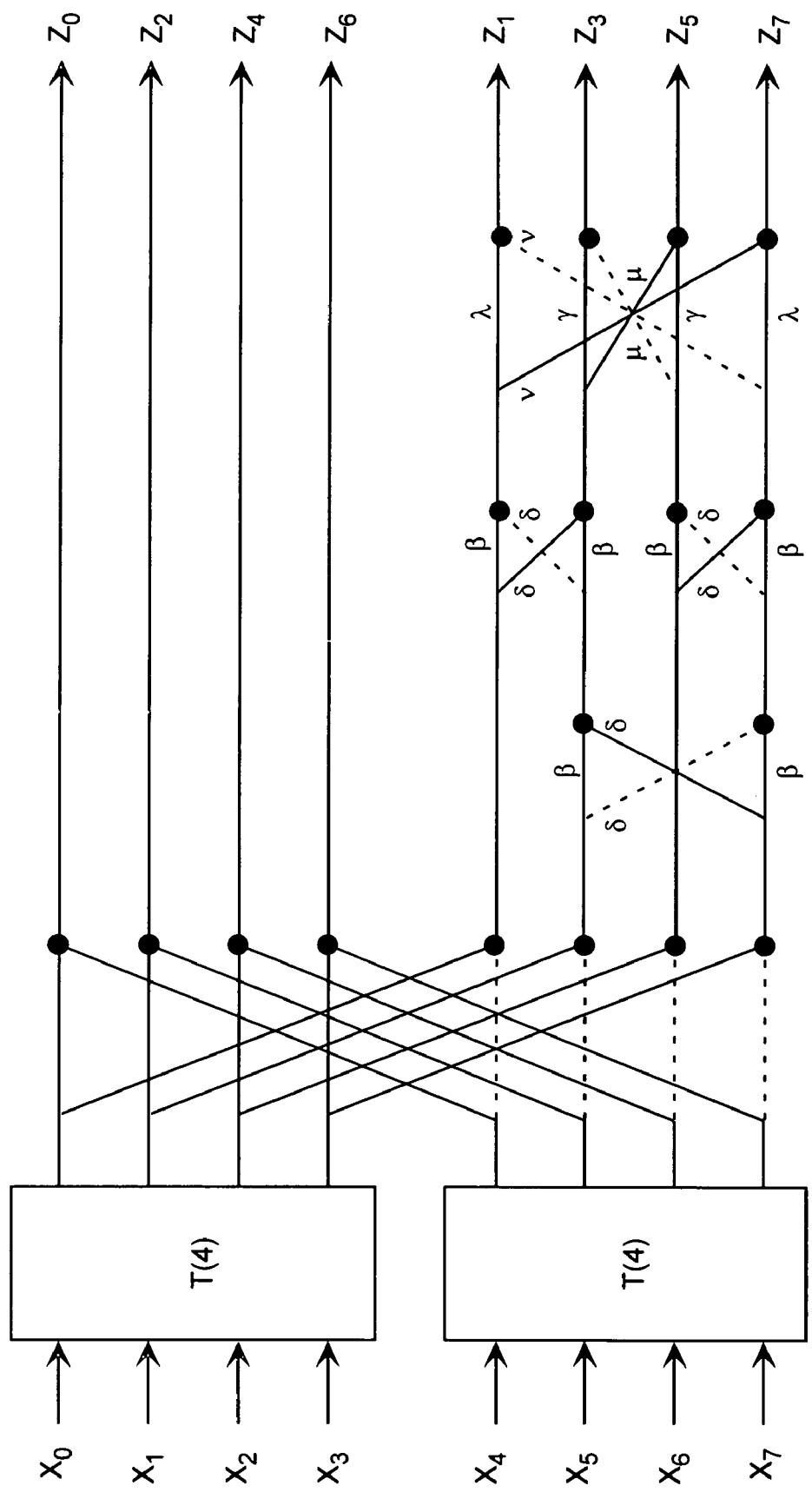
FIG. 4D is a flow diagram of an 8th order radix-2 DCT merge flow process.
Figure 7A:
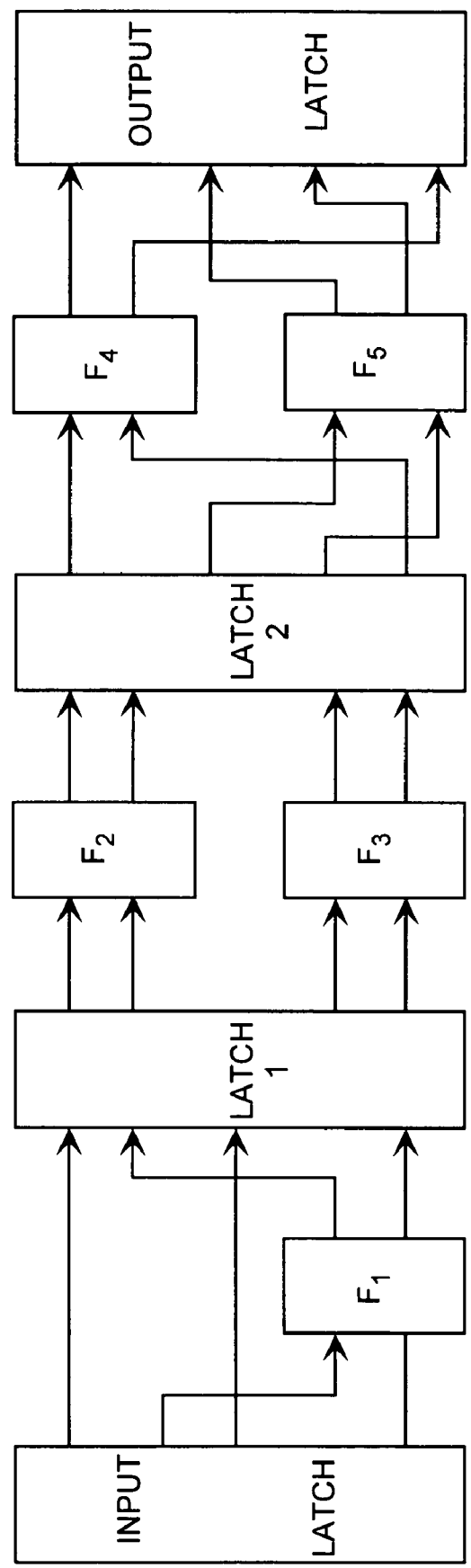
FIG. 7A is a block diagram of a C(4) combiner.
Figure 7B:
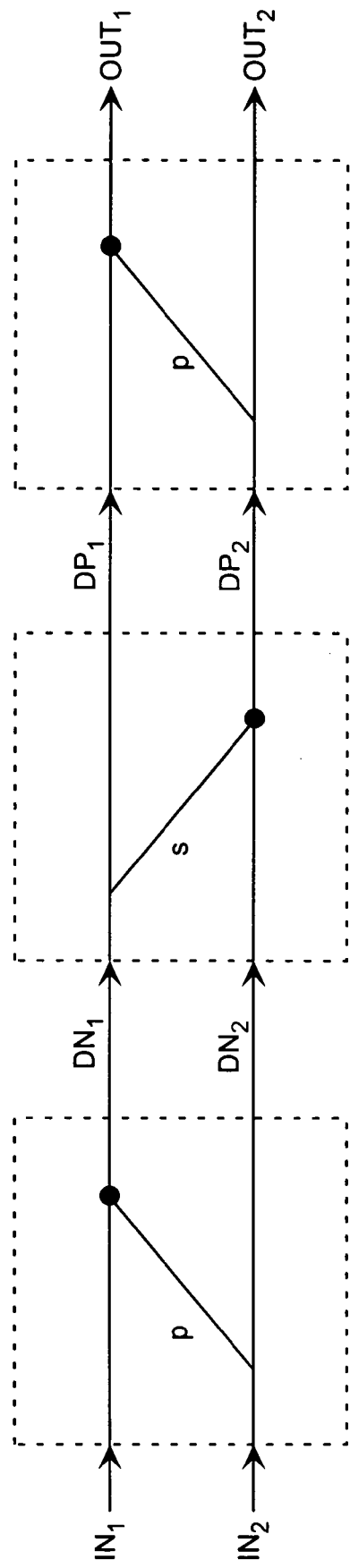
FIG. 7B is a block diagram of a fused operation process.

In the $C(4)$ equation, $\beta=\cos(\pi/8)$, $\delta=\sin(\pi/8)$, $\lambda=\cos(\pi/16)$, $\gamma=\cos(3\pi/16)$, $\mu=\cos(3\pi/16)$, and $\nu=\sin(\pi/16)$. The implementations of $C(4)$ using fused arithmetic logic circuits is shown in FIGS. 7A and 7B. By substituting this $C(4)$ equation into the true radix-2 decimation-in-frequency DCT equation for $M=4$, an 8th-order DCT radix-2 merge flow process is generated as shown in FIG. 4D.

The true radix-2 decimation-in-frequency DCT equation clearly indicates the architecture of merging two lower-order DCTs into the next higher-order DCT, which may be performed completely in the DCT domain. The merge block process based on the true radix-2 decimation-in-frequency DCT equation is shown in FIG. 4C. For the purpose of splitting a DCT into two lower-order DCTs, the true radix-2 decimation-in-frequency DCT equation may be converted into a true split decimation-in-frequency DCT equation.

$$\begin{bmatrix} T(M) & 0 \\ 0 & T(M) \end{bmatrix} = \frac{1}{\sqrt{2}} \begin{bmatrix} I(M) & I(M) \\ I^*(M) & -I^*(M) \end{bmatrix} \begin{bmatrix} I(M) & 0 \\ 0 & C^t(M) \end{bmatrix} P(N)T(N)$$

Again the $C^t(M)$ function is recursive. The split block process based on the true split decimation-in-frequency DCT equation is shown in FIG. 4A, and the 8th-order DCT radix-2 split flow process is shown in FIG. 4B. The true radix-2 DCT equations are recursive in that the higher-order DCT can be calculated from two identical lower-order DCT or vice versa. Due to this relationship, the true radix-2 DCT algorithms can perform true merge and split processes strictly in the DCT domain.

Referring to FIG. 4A, that shows an Nth-order radix-2 DCT split block process, time or spatial data is fed into an N-point DCT. The even half of the DCT output is then fed into the add and subtract processing, whereas the odd half of the DCT output is firstly fed into the multiply and add processing then into the add and subtract processing. The upper-half output from the add and subtract processing is the N/2-point DCT of the first half of the original data. The lower-half output from the add and subtract processing is the N/2-point DCT of the second half of the original data samples. Thus, the N-point DCT block output has been successfully split into two N/2-point DCT data blocks.

Referring to FIG. 4B, that shows an 8th-order radix-2 DCT split flow process, time or spatial data is fed into an 8-point DCT. The even half of the DCT output is then fed into the add and subtract processing, whereas the odd half of the DCT output is firstly fed into the multiply and add processing and then into the add and subtract processing. The upper half output from the add and subtract processing is the 4-point DCT of the first half of the original data. The lower half output from the add and subtract processing is the 4-point DCT of the second half of the original data. Thus, the 8-point DCT output has been successfully split into two 4-point DCT data.

Referring to FIG. 4C, that shows an Nth-order radix-2 DCT merge block process, two halves of time or spatial data are respectively fed into two N/2-point DCT blocks. The first DCT block output is then fed into the add and subtract processing, whereas the second DCT block output is firstly fed into the add and subtract processing and then into the multiply and add processing. The up half output from the add and subtract processing is the even-point DCT of the original data. The output from the multiply and add processing is the odd-point DCT of the original data. Thus, two N/2-point DCT block outputs have been successfully merged into an N-point DCT data block.

Referring to FIG. 4D, that shows an 8th-order radix-2 DCT merge flow process, two halves of time or spatial data are respectively fed into two 4-point DCT blocks. The first DCT block output is then fed into the add and subtract processing, whereas the second DCT block output is firstly fed into the add and subtract processing and then into the multiply and add processing. The upper half output from the add and subtract processing is the even-point DCT of the original data. The output from the multiply and add processing is the odd-point DCT of the original data. Thus, two 4-point DCT outputs have been successfully merged into an 8-point DCT data.

Discrete Sine Transforms (DST)

Referring to FIGS. 5A through 5D, the Discrete Sine transform in one dimension is defined by the DST definition equation.

$$z(k) = \sqrt{\frac{2}{N}} \varepsilon_k \sum_{n=0}^{N-1} x(n)\cos[(2n+1)(k+1)\pi/(2N)]$$

In the, DST definition equation, $\epsilon_k=1/\sqrt{2}$ for $k=1$, and $\epsilon_k=1/\sqrt{2}$ for $k\neq 0$. The Discrete Sine transform in one dimension is represented by the linear equation $z=T(N)x$, where x is the input vector with elements $\{x_n; n=0,1,2,\ldots,N-1\}$ and z is the output vector with elements $\{z_k; k=0,1,2,\ldots,N-1\}$. All the elements in both x and z are arranged in natural order. $S(N)$ is the orthonormal DST matrix of order N. Using the relationship between DST and DCT, $S(N)=J(N)T(N)I^*(N)$, a true radix-2 decimation-in-frequency DST equation is derived.

$$S(N) =$$

$$\frac{1}{\sqrt{2}} P^t(N) \begin{bmatrix} 0 & J(M)C(M)J(M) \\ I(M) & 0 \end{bmatrix} \begin{bmatrix} I(M) & -I^*(M) \\ I(M) & I^*(M) \end{bmatrix} \begin{bmatrix} S(M) & 0 \\ 0 & S(M) \end{bmatrix}$$

In the true radix-2 decimation-in-frequency DST equation, $C(M)=D(M)T^t(M)$ and the superscript t denotes transpose only. The $C(M)$ obeys the same recursive DCT $C(N)$ equation.

$$C(N) = R_4(N) \begin{bmatrix} C(M) & 0 \\ 0 & C(M) \end{bmatrix} R_2^t(N)$$

Figure 5B:
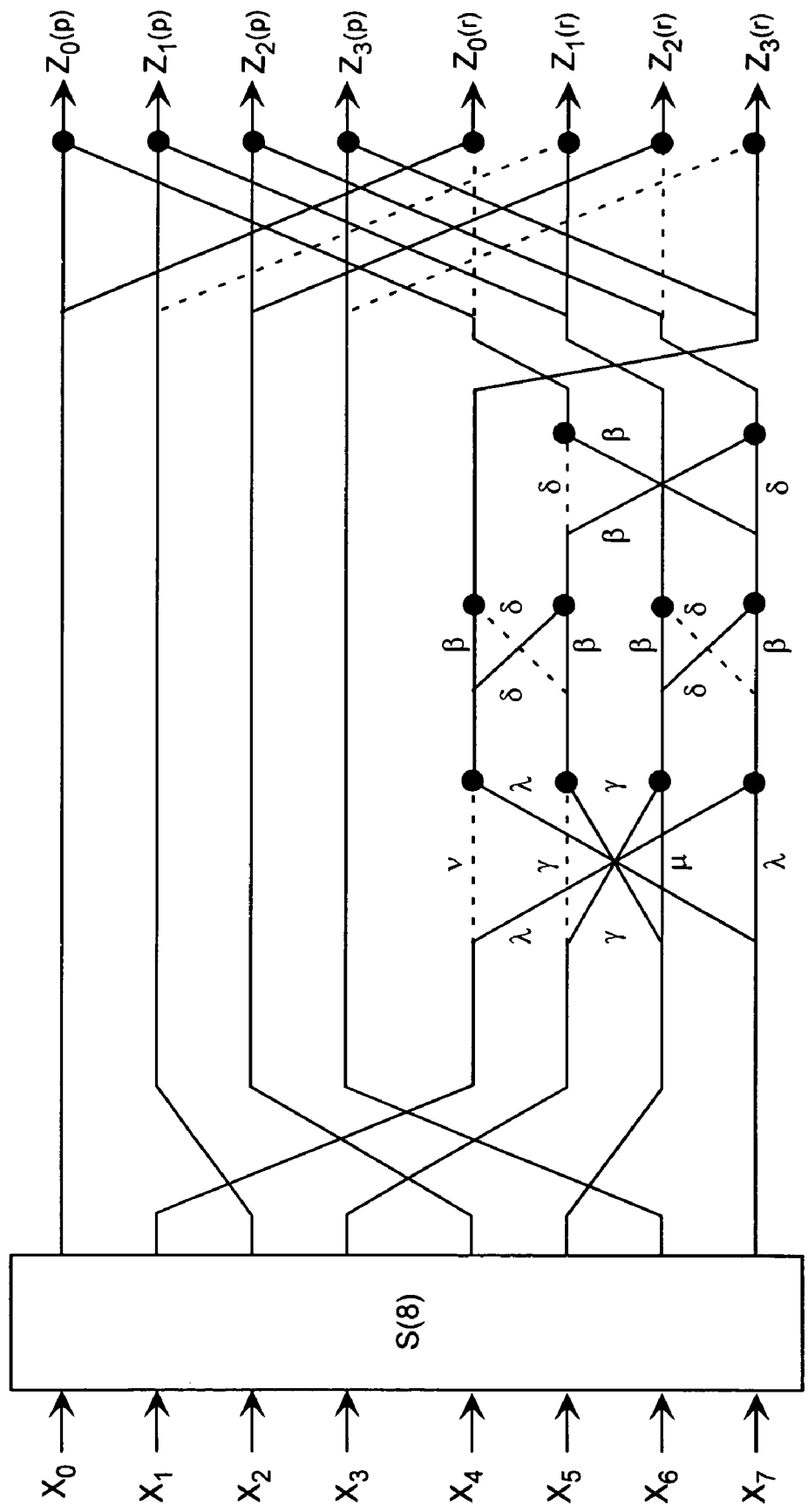
FIG. 5B is a block diagram of an 8th order radix-2 DST split flow process.
Figure 5C:
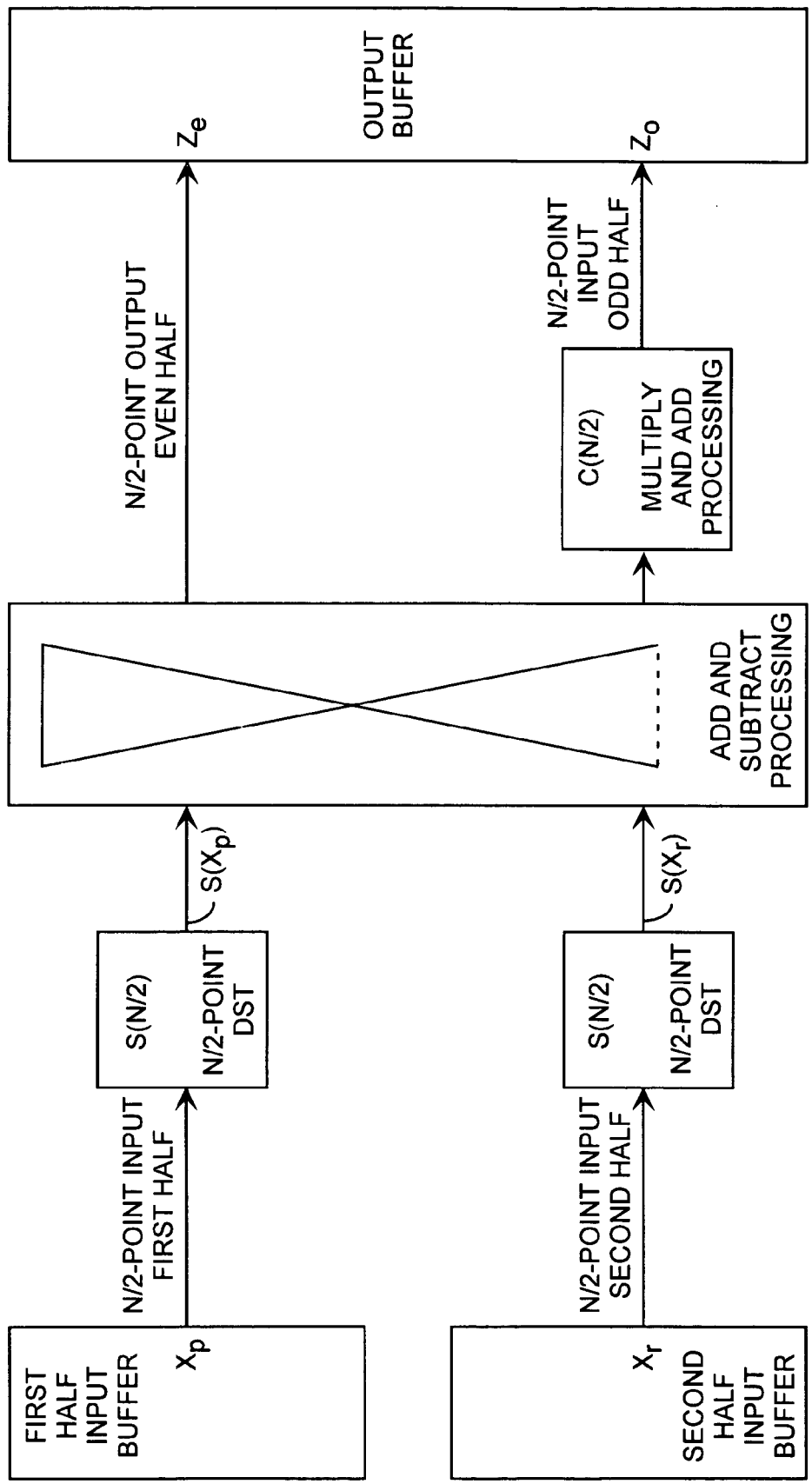
FIG. 5C is a flow diagram of an 8th order radix-2 DST merge block process.
Figure 5D:
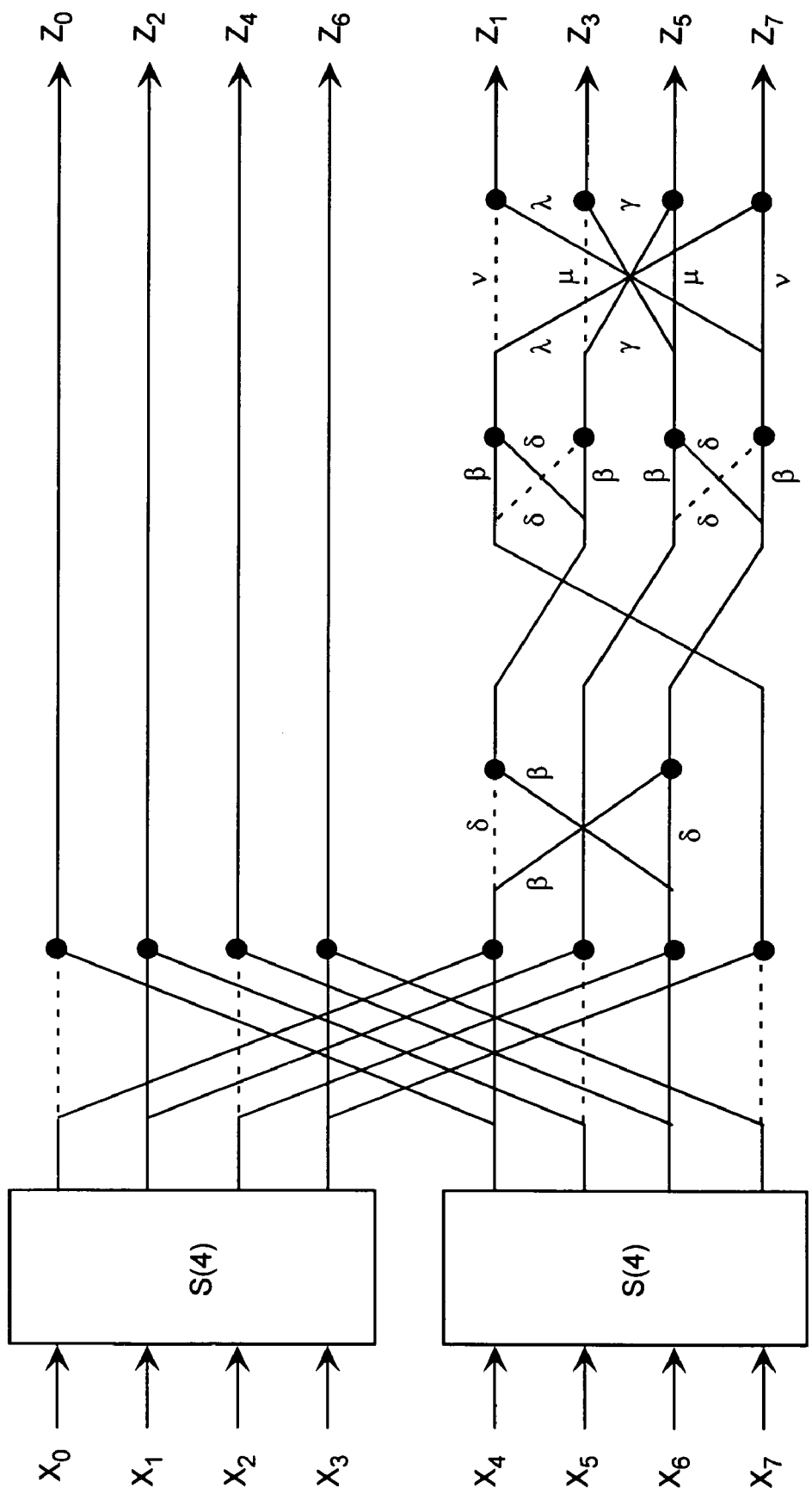
FIG. 5D is a flow diagram of an 8th order radix-2 DST merge flow process.

In the recursive DCT $C(N)$ equation, $R_2(N)$ and $R_4(N)$ are rotation matrices. The true radix-2 decimation-in-frequency DST equation indicates the architecture of merging two lower-order DSTs into the next higher-order DST, which may be performed completely in the DST domain. The merge block process based on the true radix-2 decimation-in-frequency DST equation is shown in FIG. 5C. By substituting the same DCT C(4) equation into the true radix-2 decimation-in-frequency DST equation for M=4, an 8th-order DST radix-2 merge flow process is generated as shown in FIG. 5D. The implementations of the C(4) equation, using fused arithmetic logic circuits, is shown in FIGS. 7A and 7B. For the purpose of splitting an DST into two lower-order DSTs, the true radix-2 decimation-in-frequency DST equation may be converted into a true split decimation-in-frequency DST equation.

$$\begin{bmatrix} S(M) & 0 \\ 0 & S(M) \end{bmatrix} =$$

$$\frac{1}{\sqrt{2}} \begin{bmatrix} I(M) & I(M) \\ I^*(M) & -I^*(M) \end{bmatrix} \begin{bmatrix} 0 & I(M) \\ J(M)C^t(M)J(M) & 0 \end{bmatrix} P(N)S(N)$$

Again the $C^t(M)$ term is recursive. The split block process based on the true split decimation-in-frequency DST equation is shown in FIG. 5A, and the 8th-order DST radix-2 split flow process is shown in FIG. 5B. The true radix-2 DST equations are recursive in that the higher-order DST can be calculated from two identical lower-order DST or vice versa. Due to this relationship, the true radix-2 DST algorithms can perform true merge and split processes strictly in the DST domain.

Referring to FIG. 5A, that shows an Nth-order radix-2 DST split block process, time or spatial data is fed into an N-point DST. The even half of the DST output is then fed into the add and subtract processing, whereas the odd half of the DST output is firstly fed into the multiply and add processing and then into the add and subtract processing. The upper-half output from the add and subtract processing is the N/2-point DST of the first half of the original data. The lower-half output from the add and subtract processing is the N/2-point DST of the second half of the original data. Thus, the N-point DST block output has been successfully split into two N/2-point DST data blocks.

Referring to FIG. 5B, that shows an 8th-order radix-2 DST split flow process, time or spatial data is fed into an 8-point DST. The even half of the DST output is then fed into the add and subtract processing, whereas the odd half of the DST output is firstly fed into the multiply and add processing and then into the add and subtract processing. The upper half output from the add and subtract processing is the 4-point DST of the first half of the original data. The lower half output from the add and subtract processing is the 4-point DST of the second half of the original data. Thus, the 8-point DST output has been successfully split into two 4-point DST data.

Referring to FIG. 5C, that shows an Nth-order radix-2 DST merge block process, two halves of time or spatial data are respectively fed into two N/2-point DST blocks. The first DST block output is then fed into the add and subtract processing, whereas the second DST block output is firstly fed into the add and subtract processing and then into the multiply and add processing. The upper half output from the add and subtract processing is the even-point DST of the original data. The output from the multiply and add processing is the odd-point DST of the original data. Thus, two N/2-point DST block outputs have been successfully merged into an N-point DST data block.

Referring to FIG. 5D, that shows an 8th-order radix-2 DST merge flow process, two halves of time or spatial data are respectively fed into two 4-point DST blocks. The first DST block output is then fed into the add and subtract processing, whereas the second DST block output is firstly fed into the add and subtract processing and then into the multiply and add processing. The upper half output from the add and subtract processing is the even-point DST of the original data. The output from the multiply and add processing is the odd-point DST of the original data. Thus, two 4-point DST outputs have been successfully merged into an 8-point DST data.

Karhunen-Loeve Transforms (KLT)

Referring to FIGS. 6A through 6D, the one-dimensional KLT for the first-order Markov stationary random process is defined by a KLT definition equation.

$$z(k) = \sqrt{\frac{2}{N+\lambda_k}} \varepsilon_k \sum_{n=0}^{N-1} x(n)\cos\left[(n+1/2)\omega_k - \frac{N}{2}(\omega_k - k\pi/N)\right]$$

In the KLT definition equation, $k=0,1,2,\ldots,N-1$, where $\epsilon_k=1/\sqrt{2}$ for $k=0$, and $\epsilon_k=1$ for $k \neq 0$. The term V is used to denote the transform matrix given by the KLT definition equation. The KLT matrix V is related to the DCT matrix T by $V(N)=P^t(N)U(N)P(N)T(N)$, where U is a block-diagonal matrix as given by a $U(N)$ equation.

$$U(N) = \begin{bmatrix} U_1(M) & 0 \\ 0 & U_2(M) \end{bmatrix}$$

Substituting the U(N) equation and the true radix-2 decimation-in-frequency DCT equation into $V(N)=P^t(N)U(N)P(N)T(N)$ derives a true radix-2 KLT merge equation.

$$V(N) = \frac{1}{\sqrt{2}} P^t(N) \begin{bmatrix} A_1(M) & 0 \\ 0 & A_2(M) \end{bmatrix} \begin{bmatrix} I(M) & I^*(M) \\ I(M) & -I^*(M) \end{bmatrix} \begin{bmatrix} V(M) & 0 \\ 0 & V(M) \end{bmatrix}$$

Figure 6A:
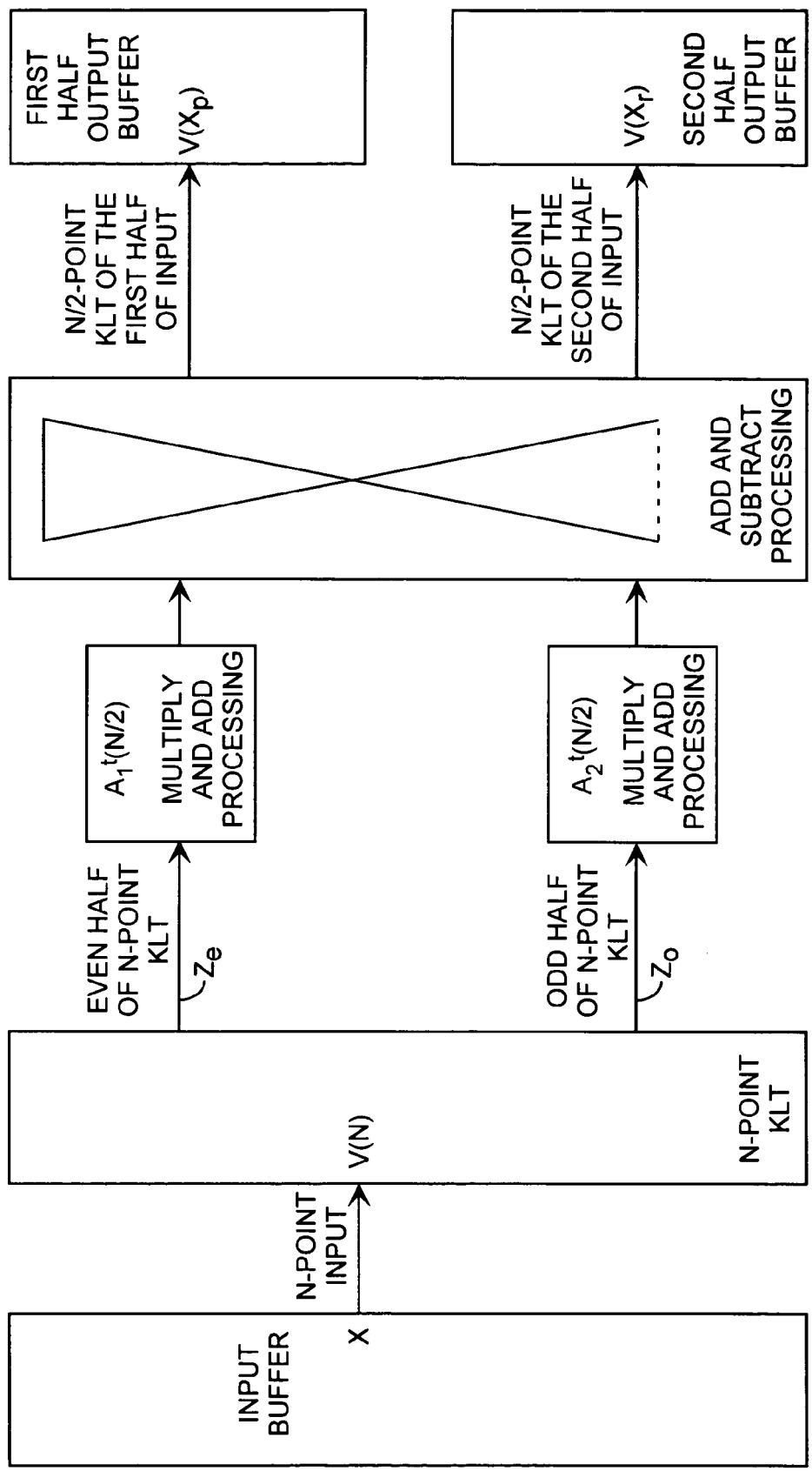
FIG. 6A is a block diagram of an Nth order radix-2 KLT split block process.
Figure 6B:
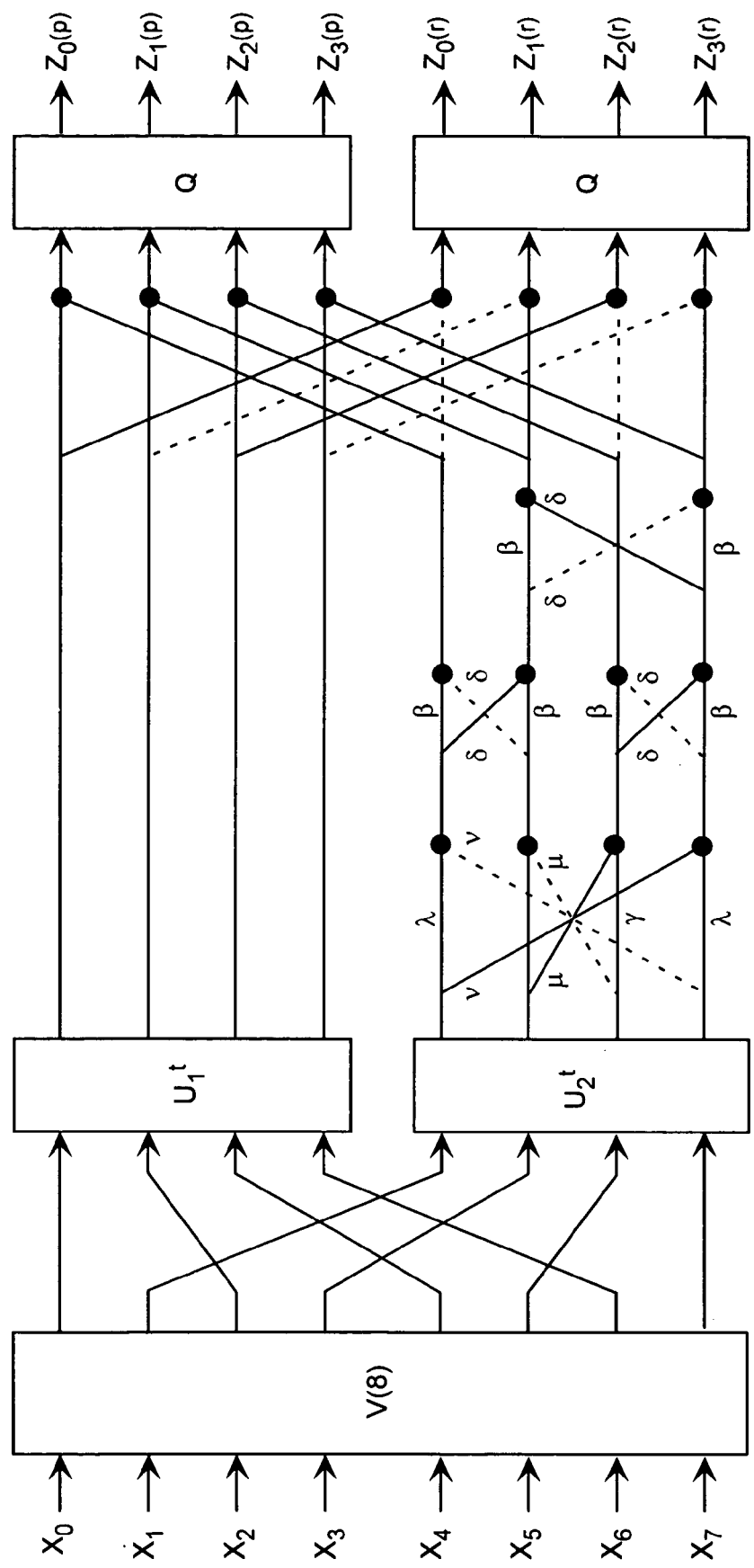
FIG. 6B is a block diagram of an 8th order radix-2 KLT split flow process.
Figure 6C:
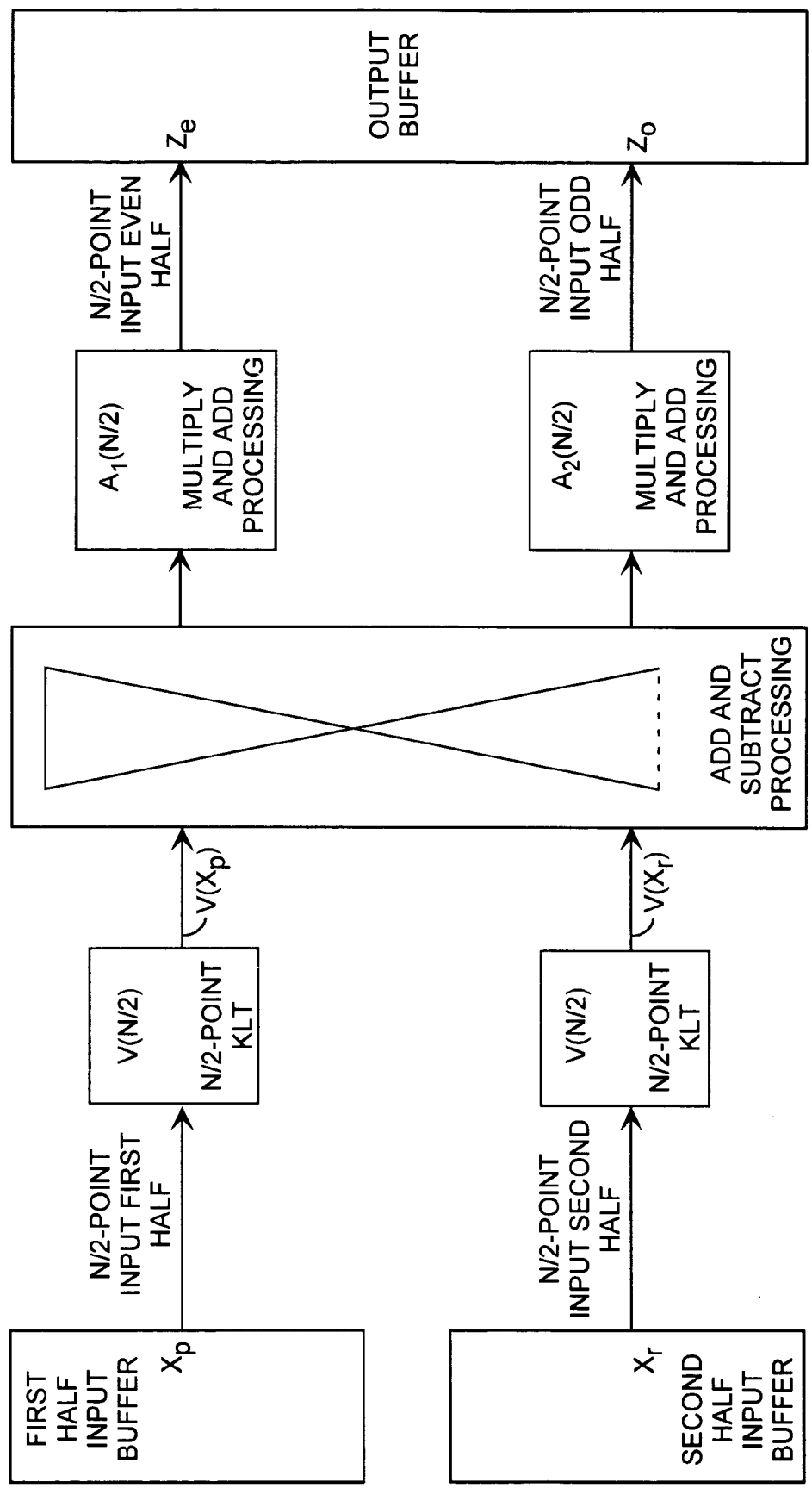
FIG. 6C is a block diagram of an nth order radix-2 KLT merge block process.
Figure 6D:
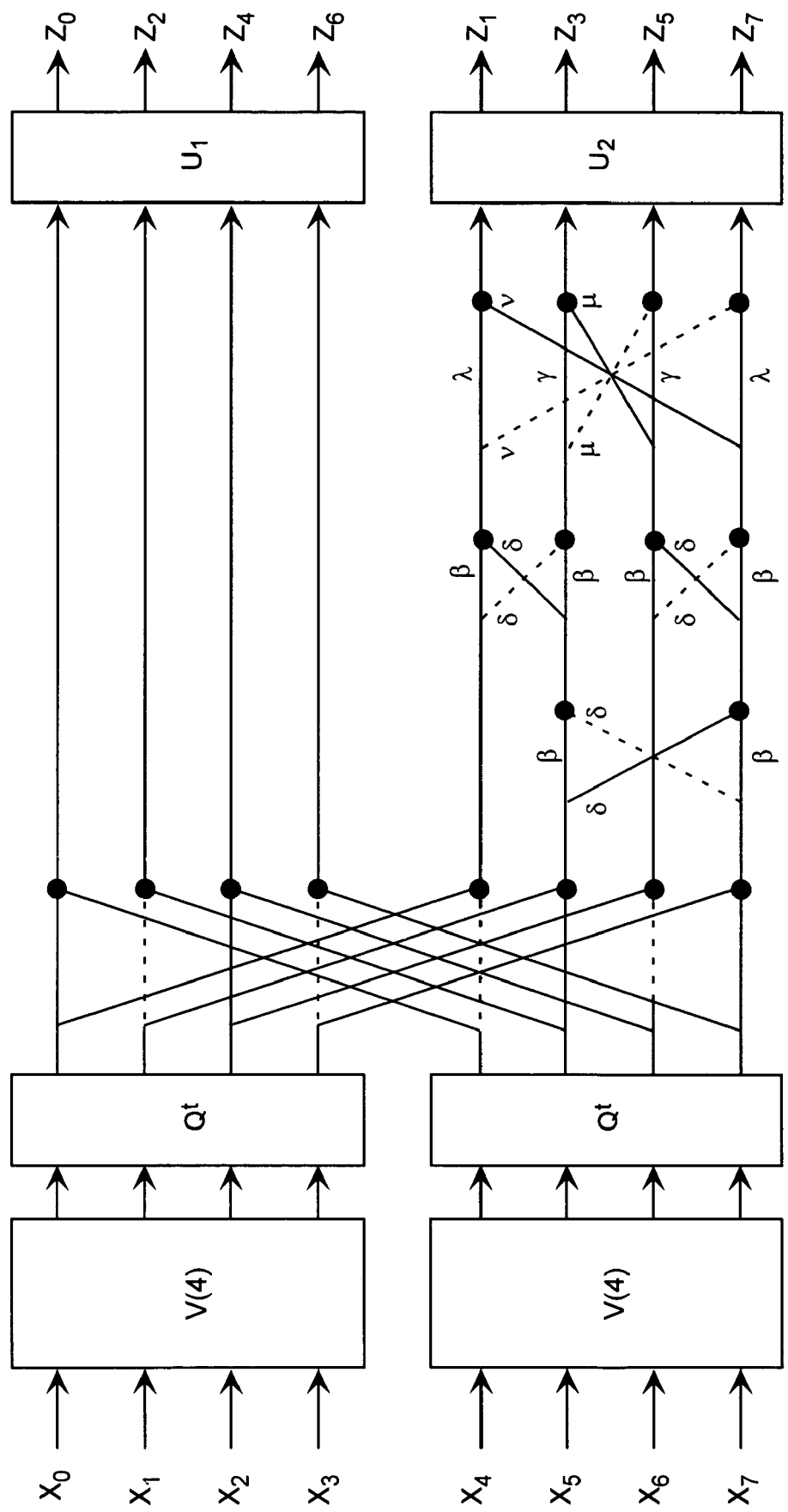
FIG. 6D is a flow diagram of an 8th-Order KLT radix-2 merge flow process.

In the true radix-2 KLT merge equation, $A_1(M)=U_1(M)Q^t(M)$ and $A_2(M)=U_2(M)C(M)Q^t(M)$. The true radix-2 KLT merge equation indicates the architecture of merging two lower-order KLTs into the next higher-order KLT, which may be performed completely in the KLT domain. The Nth-order radix-2 KLT merge block process is shown in FIG. 6C. By substituting the same DCT C(4) equation into the true radix-2 KLT merge equation for M=4, an 8th-order KLT radix-2 merge flow process is generated as shown in FIG. 6D. For the purpose of splitting a KLT into two lower-order KLTs, the true radix-2 KLT merge equation may be converted into a true radix-2 KLT split equation.

$$\begin{bmatrix} V(M) & 0 \\ 0 & V(M) \end{bmatrix} = \frac{1}{\sqrt{2}} \begin{bmatrix} I(M) & I(M) \\ I^r(M) & -I^r(M) \end{bmatrix} \begin{bmatrix} A_1^t(M) & 0 \\ 0 & A_2^t(M) \end{bmatrix} P(N)V(N)$$

Again the term C(M) in an $A_2(M)=U_2(M)C(M)Q^t(M)$ equation, is recursive. The split block process based on the true radix-2 KLT split equation is shown in FIG. 6A, and the 8th-order KLT radix-2 split flow process is shown in FIG. 6B. The true radix-2 KLT equations are recursive in that the higher-order KLT can be calculated from two identical lower-order KLT or vice versa. Due to this relationship, the true radix-2 KLT algorithms can perform true merge and split processes strictly in the KLT domain.

Referring to FIG. 6A, that shows an Nth-order radix-2 KLT split block process, time or spatial data is fed into an N-point KLT. The even half of the KLT output is firstly fed into the first multiply and add processing and then into the add and subtract processing, whereas the odd half of the KLT output is firstly fed into the second multiply and add processing and then into the add and subtract processing. The upper-half output from the add and subtract processing is the N/2-point KLT of the first half of the original data. The lower-half output from the add and subtract processing is the N/2-point KLT of the second half of the original data. Thus, the N-point KLT block output has been successfully split into two N/2-point KLT data blocks.

Referring to FIG. 6B, that shows an 8th-order radix-2 KLT split flow process, time or spatial data is fed into an 8-point KLT. The even half of the KLT output is firstly fed into the first multiply and add processing and then into the add and subtract processing, whereas the odd half of the KLT output is firstly fed into a cascade of two stages of multiply and add processing and then into the add and subtract processing. The upper half output from the add and subtract processing is then fed into an output multiply and add processing to obtain the 4-point KLT of the first half of the original data. The lower half output from the add and subtract processing is also fed into an output multiply and add processing to obtain the 4-point KLT of the second half of the original data. Thus, the 8-point KLT output has been successfully split into two 4-point KLT data.

Referring to FIG. 6C, that shows an Nth-order radix-2 KLT merge block process, two halves of time or spatial data are respectively fed into two N/2-point KLT blocks. The first KLT block output is firstly fed into the add and subtract processing and then into the first multiply and add processing, whereas the second KLT block output is firstly fed into the add and subtract processing then into the second multiply and add processing. The output from the first add and subtract processing is the even-point KLT of the original data. The output from the second multiply and add processing is the odd-point KLT of the original data. Thus, two N/2-point KLT block outputs have been successfully merged into an N-point KLT data block.

Referring to FIG. 6D, that shows an 8th-order radix-2 KLT merge flow process, two halves of time or spatial data are respectively fed into two 4-point KLT blocks. The first KLT block output is firstly fed into a multiply and add processing and then into the add and subtract processing, whereas the second KLT block output is also firstly fed into a multiply and add processing and then into the add and subtract processing. The upper-half output from the add and subtract processing is then fed into an output multiply and add processing to obtain the even-point KLT of the original data. The lower-half output from the add and subtract processing is then fed into a cascade of two stages of output multiply and add processing to obtain the odd-point KLT of the original data. Thus, two 4-point KLT block outputs have been successfully merged into an 8-point KLT data.

Referring to FIGS. 7A and 7B, an implementation of a C(4) combiner is shown in FIG. 7A, including fused circuits, F1 through F5, one of which is shown in FIG. 7B. The Fourth order combiner C(4) is used in DCT, DST, and KLT processes. The combiner C(4) is given by the following C(4) factor equation.

$$C(4) = \begin{bmatrix} \lambda & 0 & 0 & \nu \\ 0 & \gamma & \mu & 0 \\ 0 & -\mu & \gamma & 0 \\ -\nu & 0 & 0 & \lambda \end{bmatrix} \begin{bmatrix} \beta & \delta & 0 & 0 \\ -\delta & \beta & 0 & 0 \\ 0 & 0 & \beta & \delta \\ 0 & 0 & -\delta & \beta \end{bmatrix} \begin{bmatrix} 1 & 0 & 0 & 0 \\ 0 & \beta & 0 & -\delta \\ 0 & 0 & 1 & 0 \\ 0 & \delta & 0 & \beta \end{bmatrix}$$

In the C(4) equation, $\beta=\cos(\pi/8)$, $\delta=\sin(\pi/8)$, $\lambda=\cos(\pi/16)$, $\gamma=\cos(3\pi/16)$, $\mu=\cos(3\pi/16)$, and $\nu=\sin(\pi/16)$. The above C(4) equation consists of five 2 by 2 unitary rotation operations. Each unitary rotation is given by the form of a rotator equation.

$$\begin{bmatrix} c_k & s_k \\ -s_k & c_k \end{bmatrix} = \begin{bmatrix} 1 & 0 \\ p_k & 1 \end{bmatrix} \begin{bmatrix} 1 & s_k \\ 0 & 1 \end{bmatrix} \begin{bmatrix} 1 & 0 \\ p_k & 1 \end{bmatrix}$$

In the rotator equation, $c_k=\cos(\theta_k)$, $s_k=\sin(\theta_k)$, $p_k=(c_k-1)$, and $-s_k=\tan(\theta_k/2)$. The implementation of the C(4) equation is shown in FIG. 7B, where F is used to depict the unitary rotation operation. There are four data samples that are temporarily stored in the input buffer. The second and the fourth data samples are fed into a unitary rotator, $F_1$, where the rotation angle is $-(\pi/8)$. The two outputs from the $F_1$ rotator, and the first and the third data samples in the input latch are now transferred to latch 1. The latch 1 inputs are stored in-place to be latched out to the next two rotators, $F_2$ and $F_3$ in the next clock cycle. The first and the second outputs from latch 1 are fed into rotator $F_2$, whereas the third and fourth outputs from latch 1 are fed into rotator $F_3$. Each of these two rotators has an identical rotation angle as $\pi/8$. In the following clock cycle, both outputs from rotators $F_2$ and $F_3$ are fed into latch 2. In the next clock cycle, the first and the fourth data samples in latch 2 are transferred into rotator $F_4$, and, at the same time, the second and the third data samples in latch 2 are transferred into rotator $F_5$. The rotation angle of rotator $F_4$ is $\pi/16$, whereas the rotation angle of rotator $F_5$ is $3\pi/16$. In the following clock cycle, the first and the second outputs of rotator $F_4$ are fed into the first and the fourth inputs of output latch respectively, and, at the same time, the first and the second outputs of rotator $F_5$ are fed into the second and the third inputs of output latch respectively. Finally, in the next clock cycle, the data samples that were temporarily stored in the output latch are ready for output.

The implementation of the rotator equation of the fused rotator $F_1$ through $F_5$, as shown in FIG. 7B. The p and S symbols represent multiplication constants and the solid black dots represent adders. There are three cascading stages in a fused rotator. In each cascaded stage, the inputs to the adder are given in the form as one data sample adding to the multiplication result of the other data sample multiplied by the multiplication constant. For example, the first stage of the rotator in FIG. 7B is to perform the following arithmetic operations: $DN_1=IN_1+(p \cdot IN_2)$ and $DN_2=IN_2$. Instead of using two instructions for one multiplication followed by one addition, one fused instruction is all that is needed for each stage of the rotator. One fused operation is faster than the two-step operation of one multiplication followed by one addition. The same fused operation is performed in the middle stage of the rotator except that the first input and the second input have exchanged places, and hence the first output is the same as the first input, whereas the second output is the fused operation of the two inputs. Precisely, the arithmetic operations in the middle stage are $DP_1=DN_1$ and $DP_2=DN_2+(s \cdot DN_1)$. The last stage of the rotator has exactly the same implementation as the first stage, that is, $OUT_1=DP_1+(p \cdot DP_2)$ and $OUT_2=DP_2$. Then, in the last stage of the rotator, the first output is the fused operation of the two inputs, whereas the second output is the same as the second input.

Implementations of the R(M) equation in both FFT and FHT processing represents a circular convolution. FIG. 8 shows how this circular convolution may be implemented using a transversal finite impulse response (FIR) filter structure. In FIG. 8, x denotes a multiplier, + denotes an adder, L denotes a latch, and R denotes the stage of shift register. At first, the coefficients are preloaded from the memory to the coefficient shift register, and at the same time, the data samples are preloaded from the input buffer via a multiplex (MUX) to the circular shift register. At each corresponding location in the circular shift register and the coefficient shift register, the data samples are multiplied by the corresponding coefficients simultaneously, and the individual results are accumulatively added. When the circular shift register shifts to the right by one stage in the next clock cycle, the same multiplication and accumulation operations repeat until the data is completely cycled through the circular shift register. The accumulated result is shifted into the output shift register at each clock cycle.

Recursive Merges

The true radix-2 decimation-in-frequency block transform may be written, for N=2M, as a radix-2 Nth-order merge equation.

$$F(N) = B(N) \begin{bmatrix} F(M) & 0 \\ 0 & F(M) \end{bmatrix}$$

In the radix-2 Nth-order, B(N) is defined by the B(N) definition equation.

$$B(N) = \frac{1}{\sqrt{2}} P^t(N) \begin{bmatrix} I(M) & 0 \\ 0 & R(M) \end{bmatrix} \begin{bmatrix} I(M) & I(M) \\ I(M) & -I(M) \end{bmatrix}$$

The B(N) function is implemented by a combinational logic. Similarly, a M=2L is used in a radix-2 Mth-order merge equation using B(M) defined by a B(M) equation.

$$F(M) = B(M) \begin{bmatrix} F(L) & 0 \\ 0 & F(L) \end{bmatrix}$$

$$B(M) = \frac{1}{\sqrt{2}} P^t(M) \begin{bmatrix} I(L) & 0 \\ 0 & R(L) \end{bmatrix} \begin{bmatrix} I(L) & I(L) \\ I(L) & -I(L) \end{bmatrix}$$

The radix-2 Mth-order merge equation is substituted into the radix-2 Nth-order merge equation for F(M) to obtain a radix-4 Nth-order merge equation.

$$F(N) = B(N) \begin{bmatrix} B(M) & 0 \\ 0 & B(M) \end{bmatrix} \begin{bmatrix} F(L) & & & \\ & F(L) & & \\ & & F(L) & \\ & & & F(L) \end{bmatrix}$$

The radix-4 Nth order equation indicates that four (N/4)-size transforms may be merged into an N-size transform. The relation between B(N) and B(M) may be derived from the recursive R(M) equation.

Recursive Splits

Taking the conjugate transpose of the radix-4 Nth-order merge equation produces the radix-4 Nth-order split equation.

$$\begin{bmatrix} F(L) & & & \\ & F(L) & & \\ & & F(L) & \\ & & & F(L) \end{bmatrix} = \begin{bmatrix} B^+(M) & 0 \\ 0 & B^+(M) \end{bmatrix} B^+(N) F(N)$$

The radix-4 Nth-order split equation indicates that an N-size transform may be split into four (N/4)-size transforms. The relation between B(N) and B(M) may be derived from the recursive R(M) equation.

The ability to create radix-n combinational processing, enables successive or back-and-forth recursive splitting and merging of transformed data in the transform domain, without data degrading inverse transformations. It should now become apparent that Nth point radix-n forward transforms and combinational processing can be derived for the general case, as well as for all other unitary transforms, including but not limited to the FFT, FHT, DCT, DST and KVT transformation methods.

The present inventions are directed to radix-2 block transform methods for true split and merge transform processing of equal sized data halves in the transform domain for enabling recursive merges and splits in transform domain without data degradation. Input data in the time domain or spatial domain during either the split and merge radix-2 forward transform processing is firstly transform processed followed by combinational processing. In the split transform process, whole transformed data is split using combinational processing into first and second transformed data halves in the transform domain as a true split. In the merge transform process, first and second transform halves are merged using combinational processing into a merged transformed data whole in the transform domain. In either case, time or spatial domain input data can be transformed into the transform domain in the form of split halves or merged wholes. The split halves can be merged by the merge combinational processing and the merged wholes can be split by the split combinational processing. The split and merge combinational processing enables recursive splits and merges in the transform domain. It should now be apparent that though the invention is described in terms of the simplest radix-2 split and merge transforms processes, the present invention equally and equivalently applies to radix-$2^N$ transforms, where the radix-$2^N$ transforms can necessarily be grouped into two transform groups forming the high order radix-2 transforms. Likewise, the combinational processing $CL_A$ and $CL_B$ can be divided in size by $2^N$ providing divided splits and merges by a factor of $2^N$ for use with radix-N transforms for successive merges and splits using $CL_A/2^N$ and $CL_B/2^N$ combinational processing. Those skilled in the art can make enhancements, improvements, and modifications to the invention, and these enhancements, improvements, and modifications may nonetheless fall within the spirit and scope of the following claims.

What is claimed is:

1. A method for split processing input data having first and second half data into first and second split Karhunen-Loeve transformed data, a Karhunen-Loeve whole transform defining first and second radix-2 Karhunen-Loeve transforms, the whole Karhunen-Loeve transform and the first and second radix-2 Karhunen-Loeve transforms are fast Karhunen-Loeve transforms, the method comprising the steps of, whole Karhunen-Loeve transforming the input data into merged Karhunen-Loeve transformed data, the merged Karhunen-Loeve transformed data equaling the whole Karhunen-Loeve transform of the input data, split combinational processing the merged Karhunen-Loeve transformed data into first and second split Karhunen-Loeve transformed data, the first and second split Karhunen-Loeve transformed data respectively equaling the first and second radix-2 Karhunen-Loeve transforms of the first and second half data, and communicating the first and second split Karhunen-Loeve transformed data over a communication link to a storage device.

2. The method of claim 1 wherein,
the whole Karhunen-Loeve transform is a whole Karhunen-Loeve forward transform, and
the first and second radix-2 Karhunen-Loeve transforms are half size forward Karhunen-Loeve transforms.

3. The method of claim 1 further comprising the step of,
recursively splitting by half size combinational processing in the Karhunen-Loeve transform domain one of the first and second split Karhunen-Loeve transformed data into half size split Karhunen-Loeve transformed data, the first and second split Karhunen-Loeve transformed data being recursively successively split into successive half size split Karhunen-Loeve transformed data.

4. The method of claim 1 further comprising the steps of,
recursively splitting by half size split combinational processing in the Karhunen-Loeve transform domain one of the first and second split Karhunen-Loeve transformed data into half size split Karhunen-Loeve transformed data, the first and second split Karhunen-Loeve transformed data being recursively successively split into successive half size split Karhunen-Loeve transformed data, and recursively merging by half size merge combinational processing in the Karhunen-Loeve transform domain two of the half size split Karhunen-Loeve transformed data into the one of the first and second split Karhunen-Loeve transformed data as double size merged Karhunen-Loeve transformed data, the double size merged Karhunen-Loeve transformed data being recursively successively merged into successive double size merged Karhunen-Loeve transformed data.

5. The method of claim 1 wherein the split combinational processing comprises at least one processing function selected from the group consisting of scaling, permutating, adding, subtracting, multiplying, dividing, or twiddle factoring.

6. The method of claim 1 wherein
the whole Karhunen-Loeve transform is V,
the radix-2 Karhunen-Loeve transforms are V/2,
the split combinational processing is $[CL_A]$, and
$[V/2,V/2]=[CL_A]V$ wherein the input data is first whole Karhunen-Loeve transformed by V and then split combinationally processed by $[CL_A]$ for providing $[V/2,V/2]$ as the first and second split Karhunen-Loeve transformed data.

7. A method for merge processing input data having first and second half data into merged Karhunen-Loeve transformed data, a whole Karhunen-Loeve transform defining the first and second radix-2 Karhunen-Loeve transforms, the whole Karhunen-Loeve transform and the first and second radix-2 Karhunen-Loeve transforms are fast Karhunen-Loeve transforms, the method comprising the steps of, communicating the first and second half data over a communication line to a storage device, radix-2 Karhunen-Loeve transforming respectively the first and second half data into first and second split Karhunen-Loeve transformed data, the first and second split Karhunen-Loeve transformed data respectively equaling the first and second radix-2 Karhunen-Loeve transforms of the first and second half data, the first half data being consecutive data of the input data, and the second half data being consecutive data of the input data, and merge combinational processing the first and second split Karhunen-Loeve transformed data into the merged Karhunen-Loeve transformed data, the merged Karhunen-Loeve transformed data equaling the whole Karhunen-Loeve transform of the input data.

8. The method of claim 7 wherein,
the whole Karhunen-Loeve transform is a whole Karhunen-Loeve forward transform, and
the first and second radix-2 Karhunen-Loeve transforms are half size forward transforms.

9. The method of claim 7 further comprising the step of,
recursively merging by double size merge combinational processing in the Karhunen-Loeve transform domain two of the merged Karhunen-Loeve transformed data into double size merged Karhunen-Loeve transformed data, the double size merged Karhunen-Loeve transformed data being recursively successively merged into successive double size merged Karhunen-Loeve transformed data.

10. The method of claim 7 further comprising the step of,
recursively merging by double size merge combinational processing in the Karhunen-Loeve transform domain two of the merged Karhunen-Loeve transformed data into the double size merged Karhunen-Loeve transformed data, the double size merged Karhunen-Loeve transformed data being recursively successively merged into successive double size merged Karhunen-Loeve transformed data, and recursively splitting by half size split combinational processing in the Karhunen-Loeve transform domain one of the first and second split Karhunen-Loeve transformed data into half size split Karhunen-Loeve transformed data, the first and second split Karhunen-Loeve transformed data being recursively successively split into successive half size split Karhunen-Loeve transformed data.

11. The method of claim 7 wherein the merge combinational processing comprises at least one processing function selected from the group consisting of scaling, permutating, adding, subtracting, multiplying, dividing, or twiddle factoring.

12. The method of claim 7 wherein
the whole transform is V,
the radix-2 Karhunen-Loeve transforms are V/2,
the merge combinational processing is $[CL_B]$, and
$V=[CL_B][V/2,V/2]$ wherein the first half data and second half input are respectively [V/2,V/2] radix-2 Karhunen-Loeve transformed into the first and second split Karhunen-Loeve transformed data and then merge combinationally processed by $[CL_B]$ for providing the merged Karhunen-Loeve transformed data.

13. A method for split and merge processing input data having first and second half data, the split processing for processing the input data respectively into first and second split Karhunen-Loeve transformed data, the merge processing for processing the input data into merged Karhunen-Loeve transformed data, the whole Karhunen-Loeve transform defining first and second radix-2 Karhunen-Loeve transforms, the whole Karhunen-Loeve transform and the first and second radix-2 Karhunen-Loeve transforms are fast Karhunen-Loeve transforms, the method comprising the steps of, whole Karhunen-Loeve transforming the first and second half data into the merged Karhunen-Loeve transformed data, the merged Karhunen-Loeve transformed data equaling the whole Karhunen-Loeve transform of the input data, split combinational processing the merged Karhunen-Loeve transformed data into first and second split Karhunen-Loeve transformed data, the first and second split Karhunen-Loeve transformed data respectively equaling the first and second radix-2 Karhunen-Loeve transforms of the first and second half data, communicating the first and second split Karhunen-Loeve transformed data over a communication line to a storage device, and merge combinational processing the first and second split Karhunen-Loeve transformed data into the merged Karhunen-Loeve transformed data.

14. The method of claim 13 wherein,
the whole Karhunen-Loeve transform is a whole forward Karhunen-Loeve transform, and
the first and second radix-2 Karhunen-Loeve transforms are half size forward Karhunen-Loeve transforms.

15. The method of claim 13 further comprising the step of,
recursively splitting by half size split combinational processing in the Karhunen-Loeve transform domain one of the first and second split Karhunen-Loeve transformed data into half size split Karhunen-Loeve transformed data, the first and second split transformed data being recursively successively split into successive half size split Karhunen-Loeve transformed data, and recursively merging by double size merge combinational processing in the Karhunen-Loeve transform domain two of the merged Karhunen-Loeve transformed data into double size merged Karhunen-Loeve transformed data, the double size merged Karhunen-Loeve transformed data being recursively successively merged into successive double size merged Karhunen-Loeve transformed data.

16. The method of claim 13 wherein,
the split combinational processing comprises at least one processing function selected from the group consisting of scaling, permutating, adding, subtracting, multiplying, dividing, or twiddle factoring, and
the merge combinational processing comprises at least one processing function selected from the group consisting of scaling, permutating, adding, subtracting, multiplying, dividing, or twiddle factoring.

17. The method of claim 13 wherein
the whole Karhunen-Loeve transform is V,
the radix-2 Karhunen-Loeve transforms are V/2,
the split combinational processing is $[CL_A]$,
the merge combinational processing is $[CL_B]$,
$[V/2,V/2]=[CL_A]V$ wherein the input data is first whole Karhunen-Loeve transformed by V and then split combinationally processed by $[CL_A]$ for providing [V/2,V/2] as the first and second split transformed data, and
$V=[CL_B][V/2,V/2]$ wherein the first half input data and second half input data are respectively [V/2,V/2] radix-2 Karhunen-Loeve transformed into the first and second split Karhunen-Loeve transformed data and then merge combinationally processed by $[CL_B]$ for providing the merged Karhunen-Loeve transformed data.

18. The method of claim 13 wherein,
the whole Karhunen-Loeve transform is V,
the radix-2 Karhunen-Loeve transforms are V/2,
the split combinational processing is $[CL_A]$,
the merge combinational processing is $[CL_B]$,
$[V/2,V/2]=[CL_A]V$ wherein the input data is first whole Karhunen-Loeve transformed by V and then split combinationally processed by $[CL_A]$ for providing [V/2,V/2] as the first and second split Karhunen-Loeve transformed data, and
$V=[CL_B][V/2,V/2]$ wherein the first half data and second half input are respectively [V/2,V/2] radix-2 Karhunen-Loeve transformed into the first and second split Karhunen-Loeve transformed data and then merged combinationally processed by $[CL_B]$ for providing the merged Karhunen-Loeve transformed data,
the method further comprising the steps of,
recursively splitting by half size combinational processing in the Karhunen-Loeve transform domain one of the first and second split Karhunen-Loeve transformed data into half size split Karhunen-Loeve transformed data, the first and second split Karhunen-Loeve transformed data being recursively successively split into successive half size split Karhunen-Loeve transformed data being defined by the half size split combinational processing of the successive half size split Karhunen-Loeve transformed data, and
recursively merging by double size combinational processing in the Karhunen-Loeve transform domain two of the merged Karhunen-Loeve transformed data into double size merged Karhunen-Loeve transformed data, the double size merged Karhunen-Loeve transformed data being recursively successively merged into successive double size merge Karhunen-Loeve transformed data being defined by the double size merge combinational processing of the successive double size merged Karhunen-Loeve transformed data.

19. The method of claim 13 wherein,
the radix-2 Karhunen-Loeve transforms are fast Karhunen-Loeve transforms.

* * * * *